United States Patent
Khasgiwala et al.

(10) Patent No.: US 9,867,139 B1
(45) Date of Patent: Jan. 9, 2018

(54) ANTENNA SWITCHING FOR TRANSMISSION DIVERSITY

(71) Applicant: Amazon Technologies, Inc., Seattle, WA (US)

(72) Inventors: Mudit Sunilkumar Khasgiwala, San Jose, CA (US); Jerry Weiming Kuo, San Jose, CA (US); Jeongsoo Kim, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/080,397

(22) Filed: Mar. 24, 2016

Related U.S. Application Data

(60) Provisional application No. 62/280,041, filed on Jan. 18, 2016.

(51) Int. Cl.
| | |
|---|---|
| *H04B 1/04* | (2006.01) |
| *H04W 52/18* | (2009.01) |
| *H04W 88/06* | (2009.01) |
| *H04B 1/3827* | (2015.01) |
| *H04B 7/06* | (2006.01) |
| *H04W 52/36* | (2009.01) |

(52) U.S. Cl.
CPC .......... *H04W 52/18* (2013.01); *H04B 1/3838* (2013.01); *H04B 7/0608* (2013.01); *H04W 52/367* (2013.01); *H04W 88/06* (2013.01)

(58) Field of Classification Search
CPC .......... H04B 1/3838; H04B 7/06; H04B 7/08; H04B 7/0608; H04W 52/18; H04W 52/30; H04W 52/367

USPC .................................. 455/120–125, 522
See application file for complete search history.

(56) References Cited

U.S. PATENT DOCUMENTS

| | | | |
|---|---|---|---|
| 8,754,822 B1* | 6/2014 | Dou ...................... | H01Q 13/10 343/702 |
| 9,337,539 B1* | 5/2016 | Ananthanarayanan ..... | H01Q 5/335 |
| 2009/0284438 A1* | 11/2009 | Matsunaga .......... | H01Q 1/2291 343/876 |
| 2012/0009884 A1* | 1/2012 | Rao ...................... | H01Q 1/243 455/73 |
| 2012/0052820 A1* | 3/2012 | Lin ...................... | H04B 1/3838 455/90.2 |
| 2012/0062424 A1* | 3/2012 | Hwang ................ | H04B 1/3838 342/374 |
| 2012/0112970 A1* | 5/2012 | Caballero ............. | H01Q 1/243 343/702 |

(Continued)

*Primary Examiner* — Duc M Nguyen
(74) *Attorney, Agent, or Firm* — Lowenstein Sandler LLP

(57) ABSTRACT

Devices and apparatuses are described. An apparatus may include radio frequency (RF) circuitry including a RF feed and a modem to transmit one or more signals via the RF feed. The apparatus may include an antenna structure including a first element and a second element. The apparatus may include an application processor coupled to the first element and the second element, where the application processor includes proximity sensing circuitry. The proximity sensing circuitry can measure a first capacitance value and a second capacitance value and the application processor can transmit a first signal of the one or more signals via the first element. The modem can determine whether an object is proximate to the first element and select the second element when the object is determined to be proximate to the second element.

20 Claims, 15 Drawing Sheets

(56) References Cited

U.S. PATENT DOCUMENTS

| | | | |
|---|---|---|---|
| 2012/0142291 A1* | 6/2012 | Rath | H04B 7/0602 455/127.1 |
| 2012/0147801 A1* | 6/2012 | Ho | H04W 52/365 370/311 |
| 2012/0214422 A1* | 8/2012 | Shi | H04B 1/3838 455/67.11 |
| 2012/0270519 A1* | 10/2012 | Ngai | H04W 52/226 455/404.1 |
| 2013/0210477 A1* | 8/2013 | Peter | H04W 64/00 455/522 |
| 2013/0257659 A1* | 10/2013 | Darnell | H01Q 1/243 343/702 |
| 2013/0316662 A1* | 11/2013 | Bengtsson | H04B 7/0874 455/77 |
| 2014/0269977 A1* | 9/2014 | Yang | H04B 1/3838 375/295 |
| 2015/0017929 A1* | 1/2015 | Ljung | H04B 7/0608 455/73 |
| 2015/0234077 A1* | 8/2015 | Komulainen | G01V 3/12 324/629 |
| 2015/0303979 A1* | 10/2015 | Shin | H04B 1/74 455/78 |
| 2016/0043752 A1* | 2/2016 | Slater | H04B 1/3838 375/297 |

\* cited by examiner

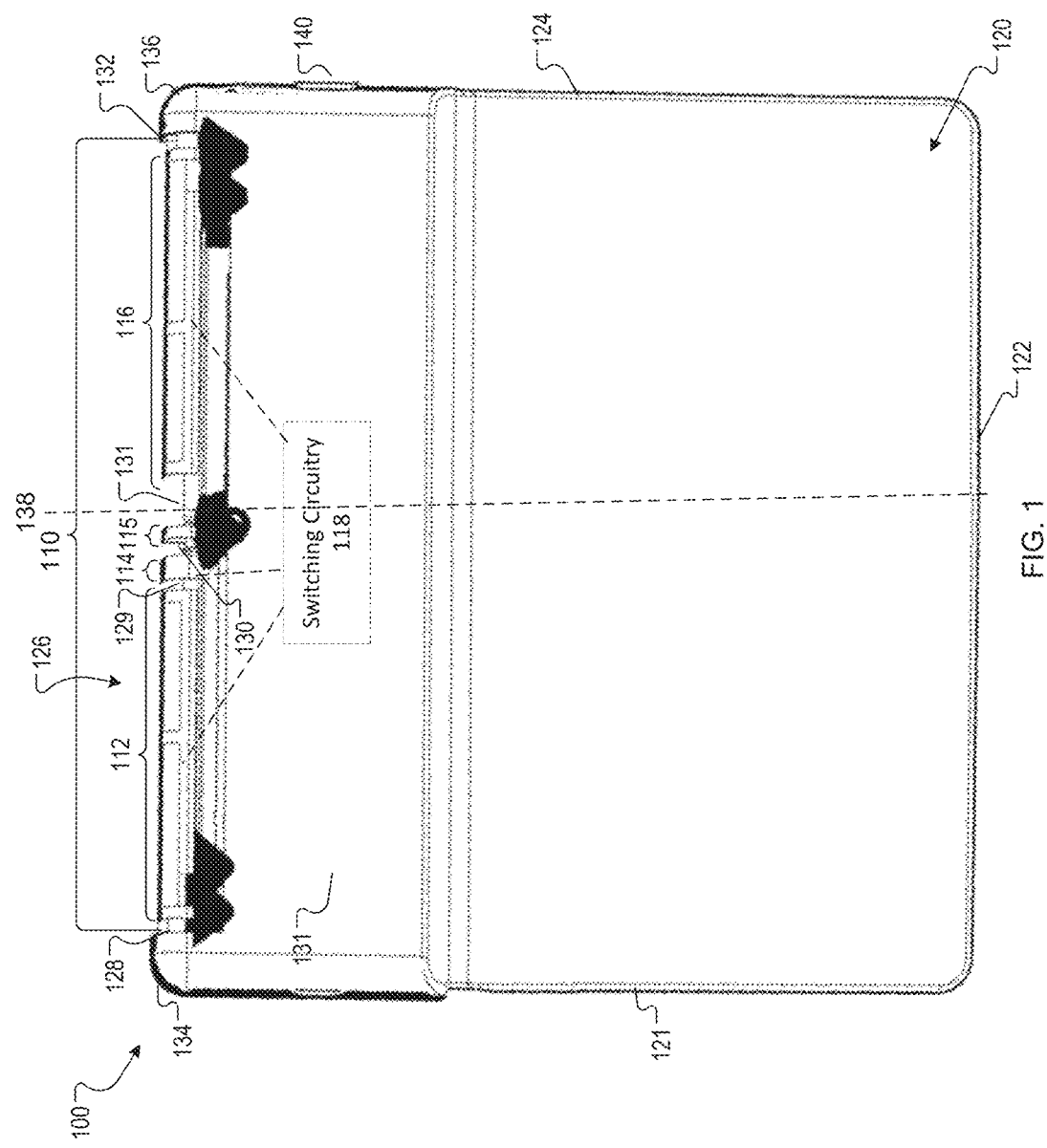

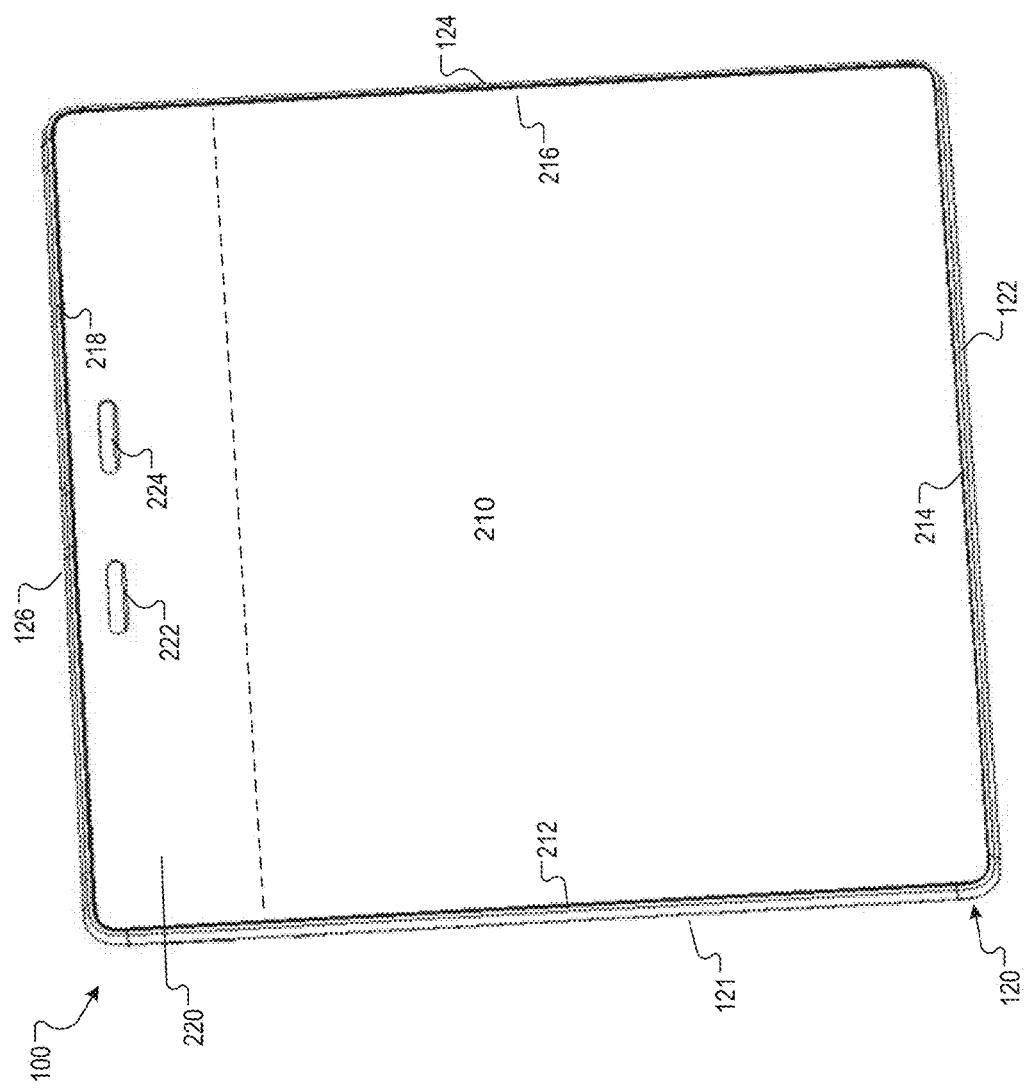

| Antenna Element | LTE-1 | LTE-2 | 2G or 3G - 1 | 2G or 3G - 2 | WLAN |
|---|---|---|---|---|---|
| Antenna 1 | B12/B4 Primary | B12/B4 Diversity | B5/B8/B1/ G850/G900/G1800 | Not active | Default state |
| Antenna 2 | B12/B4 Diversity | B12/B4 Primary | Not active | B5/B8/B1/ G850/G900/G1800 | Default state |
| WLAN Loop Antenna | Not active | Not active | Not active | Not active | Active |
| DPDT | High | Low | High | Low | X |
| SPDT1 | High | High | Low | Low | X |
| SPDT2 | High | High | Low | Low | X |

FIG. 4C

ANTENNA SWITCHING FOR TRANSMISSION DIVERSITY

CROSS-REFERENCE TO RELATED APPLICATION

This application claims the benefit of U.S. Provisional Application No. 62/280,041, filed Jan. 18, 2016, the entire disclosure of which is incorporated herein by this reference.

BACKGROUND

A large and growing population of users is enjoying entertainment through the consumption of digital media items, such as music, movies, images, electronic books, and so on. The users employ various electronic devices to consume such media items. Among these electronic devices are electronic book readers, cellular telephones, personal digital assistants (PDAs), portable media players, tablet computers, netbooks, laptops and the like. These electronic devices wirelessly communicate with a communications infrastructure to enable the consumption of the digital media items. In order to wirelessly communicate with other devices, these electronic devices include one or more antennas.

BRIEF DESCRIPTION OF DRAWINGS

The present invention will be understood more fully from the detailed description given below and from the accompanying drawings of various embodiments of the present invention, which, however, should not be taken to limit the present invention to the specific embodiments, but are for explanation and understanding only.

FIG. 1 shows a rear view of an electronic device with an antenna structure according to one embodiment.

FIG. 2 shows a front view of the electronic device with a display structure according to one embodiment.

FIG. 4C illustrates a decision table that the WAN modem or the wireless local area network (WLAN) modem can use to determine switch settings for the switching circuitry according to one embodiment.

DETAILED DESCRIPTION

Figure 3A:
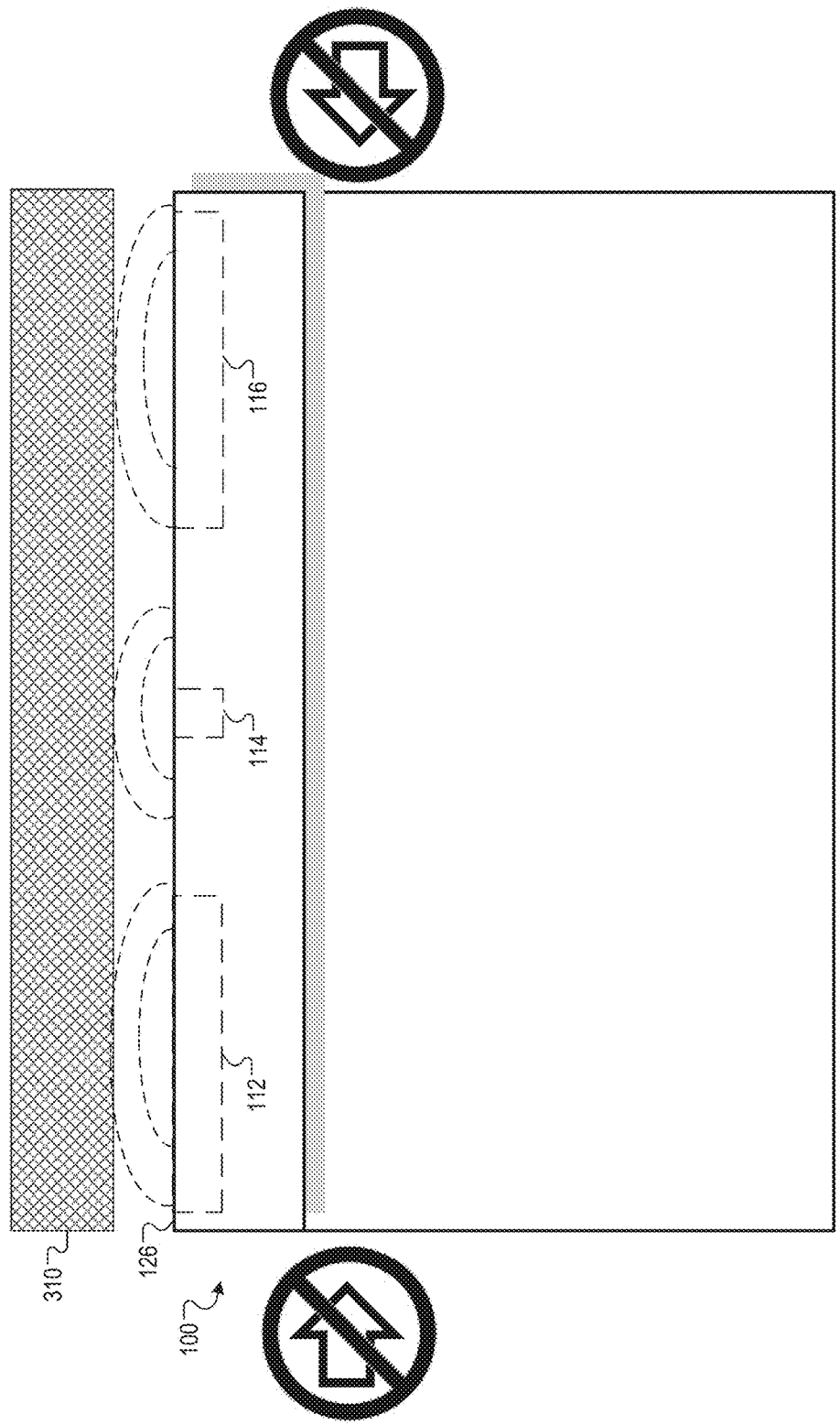
FIG. 3A illustrates the electronic device determining an object is in proximity to a top edge of the electronic device using the second strip element according to one embodiment.

Electronic devices traditionally use conventional antennas that may be externally mounted to the electronic devices (e.g., external antennas) to avoid interference from internal components and housings of the electronic devices. As electronic devices continue to be miniaturized, antennas may be integrated within the electronic devices to increase functionality and aesthetic design of the electronic devices. With the integration of antennas into the electronic devices, objects approximate the housings of the electronic devices may increase a level of interference for the integrated antennas when the electronic devices communicate data. When an antenna of an electronic device is in close proximity to other objects, the other objects may interfere with signals being sent and/or received at the device (e.g., signal interference and signal distortion). For example, when an antenna comes into close proximity of a human body or a metal object, such as is within approximately 2-3 millimeters, signal interference and signal distortion can occur because energy that is intended to be transmitted (e.g., radiated away) from the electronic device to another device may be absorbed or scattered by the human body or the metal object. For example, a human body is primarily water. When water is located between a transmitting antenna and a receiving antenna, the water can interfere with the receiving antenna receiving a signal from the transmitting antenna.

In another example, a variety of household appliances (such as cordless phones, baby monitors, and microwave ovens) can cause signal interference by using a frequency to communicate data that may be the same or similar to the transmitting antenna, such as a cordless phone using a 2.4 gigahertz (GHz) frequency may interfere the electronic device communicating using a wireless local area network (WLAN). Depending on the orientation and/or proximity of the household appliances to an antenna of the electronic device, the household appliances may interfere with the signal between the transmitting antenna and the receiving antenna. Interfering objects can reduce an antenna efficiency and performance of an antenna when transmitting and/or receiving signals. Similarly, energy that may be intended to be received by an antenna of a receiving device may be absorbed or scattered (e.g., captured) by the human body or the metal object. Signal interference or signal distortion can reduce an antenna efficiency and performance of antennas to transmit or receive data.

Traditionally, to reduce signal distortion and signal interference, the antennas of the electronic device can be located a threshold distance from the interfering object. However, for electronic devices, such as portable devices, which may be communicating in a variety of environments and conditions, separating the antennas from interfering objects can be difficult.

The embodiments described herein may address the above noted deficiencies by an electronic device switching between antennas of an antenna structure. The antenna structure herein can utilize a first portion of a housing of the electronic device as a first antenna and a second portion of the housing as a second antenna (e.g., strip elements). In one example, the electronic device can use the first antenna to communicate on a wireless communications network when there is not an object approximate to the first antenna. In another example, when there is an object approximate to the first antenna, interfering with the electronic device communicating on a communications network, the electronic device can switch to the second antenna. The antenna structure can also utilize switching elements and a switching circuitry to perform the antenna switching.

The electronic device may be any content rendering device that includes a modem for connecting the electronic device to a network. Examples of such an electronic device include an electronic book reader, a portable digital assistant, a mobile phone, a laptop computer, a portable media player, a tablet computer, a camera, a video camera, a netbook, a notebook, a desktop computer, a gaming console, a Blu-ray® or DVD player, a media center, a drone, a speech-based personal data assistant, and the like. The electronic device may connect to a network to obtain content from a server computing system (e.g., an item providing system) or to perform other activities. The electronic device may connect to one or more different types of cellular networks.

Several topologies of antenna structures are contemplated herein. The antenna structures described herein can be used for WAN technologies, such as cellular technologies including Long Term Evolution (LTE®) frequency bands, third generation (3G) frequency bands, Wi-Fi® frequency bands or other wireless local area network (WLAN) frequency bands, Bluetooth® frequency bands or other personal area network (PAN) frequency bands, global navigation satellite system (GNSS) frequency bands (e.g., positioning system (GPS) frequency bands), and so forth. In one example, the LTE® frequency bands can include a B1 band, a B2 band, a B4 band, a B5 band, a B8 band, a B12 band, or a B17 band.

In another example, the cellular network employing a third generation partnership project (3GPP®) release 8, 9, 10, 11, or 12 or Institute of Electronics and Electrical Engineers (IEEE®) 802.16p, 802.16n, 802.16m-2011, 802.16h-2010, 802.16j-2009, 802.16-2009. In another example, the wireless network may employ the WI-FI® technology following IEEE® 802.11 standards defined by the WI-FI ALLIANCE® such as the IEEE® 802.11-2012, IEEE® 802.11ac, or IEEE® 802.11ad standards. In another example, the electronic device may use the antenna structure to communicate with other devices using a secure WLAN, secure PAN, or a Private WAN (PWAN). Similarly, the electronic device may use the antenna structure to communicate using a BLUETOOTH® technology and IEEE® 802.15 standards defined by the BLUETOOTH® Special Interest Group, such as BLUETOOTH® v1.0, BLUETOOTH® v2.0, BLUETOOTH® v3.0, or BLUETOOTH® v4.0 (including BLUETOOTH® low energy). In another embodiment, the electronic device may use the antenna structure to communicate using a ZIGBEE® connection developed by the ZIGBEE® Alliance such as IEEE® 802.15.4-2003 (ZIGBEE® 2003), IEEE® 802.15.4-2006 (ZIGBEE® 2006), IEEE® 802.15.4-2007 (ZIGBEE® Pro). The preceding frequency bands are not intended to be limiting. The electronic device can use the antenna structure to communicate on other frequency bands, such as GNSS frequency bands (e.g., GPS frequency bands), and so forth.

FIG. 1 shows a rear view of an electronic device 100 with an antenna structure 110 according to one embodiment. The electronic device 100 can include a housing 120. In one embodiment, housing 120 can be a plastic material. In another embodiment, the housing 120 can be a metal material, such as steel, stainless steel, and so forth. In another example, the housing 120 is a metal cover. In one embodiment, the antenna structure 110 can be integrated into the housing 120. In another embodiment, the antenna structure 110 can be coupled to or attached to the housing 120.

For example, the housing 120 can include a first side edge 121, a bottom edge 122, a second side edge 124, and a top edge 126 around the edges of the housing 120. The antenna structure 110 can include a first strip element 112, a second strip element 114, a WLAN loop antenna 115, a third strip element 116, a first cutout 128, a second cutout 129, a third cutout 130, a fourth cutout 131, and a fifth cutout 132 can be located along the top edge 126. The first strip element 112, the second strip element 114, the WLAN loop antenna 115, the third strip element 116, the first cutout 128, the second cutout 129, the third cutout 130, the fourth cutout 131, and the fifth cutout 132 can be located along one or more of the first side edge 121, the bottom edge 122, the second side edge 124, or the top edge 126. In one embodiment, the first strip element 112, the second strip element 114, and the third strip element 116 can be metal strips of the housing 120 (such as a metal housing) of the electronic device 100. In another embodiment, the first strip element 112, the second strip element 114, a WLAN loop antenna 115, and the third strip element 116 can be stamped metal.

In one embodiment, the first strip element 112 and the third strip element 116 can be the same length. For example, the first strip element 112 and the third strip element 116 can each be 44 mm. Alternatively, the first strip element 112 and the third strip element 116 can each be between approximately 58 mm to approximately 65 mm. In another embodiment, the first strip element 112 and the third strip element 116 can be different lengths. For example, the first strip element 112 can be 42 mm and the third strip element 116 can be 46 mm. The length and location of the first strip element 112 and the third strip element 116 can vary and the preceding embodiments and examples are exemplary and not intended to be limiting.

In one embodiment, the first strip element 112 and the third strip element 116 are disposed at symmetric locations on a side of the electronic device 100 relative to a center point or a center axis 138 on the side of the electronic device 100. In one example, the center point can be the second strip element 114 or the WLAN loop antenna 115. In another example, the first strip element 112 and the third strip element 116 can be located along a top edge 126 of the housing 120 around the center axis 138. In this example, the first strip element 112 and the third strip element 116 can be at equidistance locations from the center axis 138. In another embodiment, the first strip element 112 and the third strip element 116 are disposed at non-symmetric locations along an edge of the electronic device 100, such as the top edge 126 of the housing 120.

The first strip element 112, the second strip element 114, the WLAN loop antenna 115 and the third strip element 116 can operate as part of the housing 120 in a structural manner. The antenna structure 110 can also be operational in a first mode of the electronic device 100 and in a second mode of the electronic device 100. In one example, the first mode can be an antenna mode where the antenna structure 110 can radiate as an antenna. In the first mode, the electronic device 100 can use the switching circuitry 118 to switch between using the first strip element 112 as a first antenna for communication, the WLAN loop antenna 115 as a WLAN loop antenna, or the second strip element 116 as a second antenna for communication, as described in greater detail in the proceeding paragraphs.

In another example, the second mode can be a proximity sensing mode where the antenna structure 110 can determine a proximity of an object or a user to the electronic device 100 utilizing one or more of the first strip element 112, the second strip element 114, or the third strip element 116 of the antenna structure 110 as proximity sensors. In particular, the first strip element 112, the second strip element 114, and the third strip element 116 can operate as electrodes of proximity sensing circuitry. A capacitance of the electrodes can be measured by a proximity sensing circuitry to detect an object proximate to the first strip element 112, the second strip element 114, or the third strip element 116. An advantage of the electronic device using the strip elements as part of the antenna structure 110 and as part of the proximity sensor can be to integrate the antenna structure 110 and the proximity sensor into the same structure of the electronic device.

In one example, the first mode and the second mode can be discrete modes where the electronic device 100 can operate in one of the modes at any given time. In another example, the electronic device 100 can operate in both the first mode and the second mode at the same time.

The first strip element 112 can be physically separated from a portion of the housing 120 by the first cutout 128. The first cutout 128 can be along the periphery of the housing 120 and is located between a first corner 134 of the housing 120 and the first strip element 112. In one embodiment, the first cutout 128 can be a gap between the first strip element 112 and the housing 120. In another example, the second strip element 114 is physically separated from the first strip element 112 by a second cutout 129. In another example, the WLAN loop antenna 115 can be separated from the second strip element 114 by a third cutout 130. In another example, the third strip element 116 can be separated from the WLAN loop antenna 115 by a fourth cutout 131. In another example, the third strip element 116 is physically separated from the second corner of the housing 120 by a fifth cutout 132.

The gap of the first cutout 128 can measure approximately 1.8 millimeters (mm) in width, the gap of the second cutout 129 can measure approximately 1.8 mm in width, the gap of the third cutout 130 can measure approximately 1.8 mm in width, the gap of the fourth cutout 131 can measure approximately 1.8 mm in width, and the gap of the fifth cutout 132 can measure approximately 1.8 mm in width. The gap of the first cutout 128 can measure approximately 2 mm in width, the gap of the second cutout 129 can measure approximately 2 mm in width, the gap of the third cutout 130 can measure approximately 2 mm in width, the gap of the fourth cutout 131 can measure approximately 2 mm in width, and the gap of the fifth cutout 132 can measure approximately 2 mm in width. The gap widths of the first cutout 128, the second cutout 129, the third cutout 130, the fourth cutout 131, and the fifth cutout 132 are not intended to be limiting and other widths may be used.

The electronic device 100 can also include an input device 140 along an edge of the housing, such as the second side edge 124. In one example, the input device 140 can be a button to control a functionality of the electronic device 100, such as an on/off switch. In another example, the input device 140 can be an input or output port, such as a universal serial bus (USB) port or a high definition multimedia interface (HDMI) port.

FIG. 2 shows a front view of the electronic device 100 with a display structure 210 according to one embodiment. Some numbers in FIG. 2 are similar to some numbers in FIG. 1 as noted by similar reference numbers unless expressly described otherwise. The electronic device 100 can include the display structure 210 coupled to a housing 120. In one example, the display structure 210 can be an electronic paper display (EPD). In another example, the display structure 210 can be a liquid crystal display (LCD) or a light emitting diode (LED) display. The display structure 210 can include the first side edge 121, a bottom edge 122, a second side edge 124, and a top edge 126. In one example, the first side edge 121, the bottom edge 122, the second side edge 124, and the top edge 126 of the housing 120 may be curved or rounded. In another example, the first side edge 121, the bottom edge 122, the second side edge 124, and the top edge 126 of the housing 120 may be square or straight.

The electronic device 100 can have a display structure 210 with borders 212, 214, 216, and 218 around the first side edge 121, the bottom edge 122, the second side edge 124, and the top edge 126 of the electronic device 100, respectively. In one example, the borders 212, 214, 216, and 218 can be a bezel around the display structure 210. The borders 212, 214, 216, and 218 can be where the display structure 210 adjoins the housing 120. For example, a portion of the housing 120 can surround a perimeter of the display structure 210 or can encase the display structure 210 to protect the display structure 210. The portion of the housing 120 that surrounds or encases the display structure 210 can be relatively thin, such as a 1 millimeter (mm) to 3 mm thick. The borders 212, 214, 216, and 218 can be thin and provide an appearance that the display structure is borderless or near borderless. In another example, the display structure 210 can include a dead zone 220. The dead zone 220 can be a portion of the display structure 210 that does no display information. In one example, the dead zone 220 can include various components 222 and 224 that are integrated into the display structure 210. In one example, the various components 222 and 224 can include speakers, microphone, motion sensors, cameras, and so forth. In another example, the various components 222 and 224 can include components for a tablet computing device, such as a power button, a home button, a forward button, a back button, and so forth.

FIG. 3A illustrates the electronic device 100 determining an object 310 is in proximity to a top edge 126 of the electronic device according to one embodiment. Some numbers in FIG. 3A are similar to some numbers in FIG. 1 as noted by similar reference numbers unless expressly described otherwise. In one example, the electronic device 100 can determine the object 310 is opposite or facing the first side edge 121, the bottom edge 122, the second side edge 124, or the top edge 126.

In one embodiment, the electronic device 100 may be shaped to be held by a user along the top edge 126 of the electronic device 100. In this example, the electronic device 100 can use the second strip element 114 to determine a proximity of the object 310 when the object 310 is located opposite the top edge 126 of the electronic device 100. In one example, the electronic device 100 can determine that the object 310 is opposite the top edge 126 indicating the user is holding the electronic device 100. One advantage of the electronic device 100 determining the proximity of the object 310 in the given direction, such as opposite an edge of the electronic device 100 can be to increase an accuracy of determining a location of the object 310 relative to the electronic device 100. Another advantage of the electronic device 100 determining the proximity of the object 310 in the given direction can be to decrease a size of the second strip element 114 as the strip element 114 is used to determine a proximity of the object 310 in a single direction instead of a plurality of directions.

In one example, the first strip element 112 can be located near the first corner 134 of top edge 126 and the third strip element 116 can be located near the second corner 136 of the top edge 126, where the first corner 134 and the second corner 136 are on opposite sides of the top edge. An advantage of the first strip element 112 and the third strip element 116 being located on opposite sides of the top edge can be to provide proximity sensing across substantially the entire top edge 126 by having proximity sensors near the first corner 134, the second corner 136, and the middle of the top edge 126.

In another the electronic device 100 can determine an amount of energy absorbed by the object 310 based on a proximity of the object 310 to the electronic device 100. For example, the electronic device 100 can determine an amount of energy radiated by the electronic device 100, such as energy radiated by antennas 112 and 116 as they transmit a signal. The electronic device 100 can use the second strip element 114 as a single electrode with a common ground (e.g., self-capacitance). The electronic device 100 can use a capacitance of the object 310 (such as a human body) as an input to measure a capacitive coupling between the electronic device 100 and the object 310. As the capacitive coupling increases, the object 310 absorbs an increasing amount of the energy radiated by the electronic device 100. An increase in capacitive coupling can indicate that the object 310 is coming in to closer proximity to the second strip element 114 and the object 310 is increasing in an absorption of the radiated energy.

In another embodiment, the electronic device can use the second strip element 114 as a sensing element up to a certain threshold of capacitance. The electronic device 100 can use the second strip element 114 to determine that the electronic device is meeting federal communications commission (FCC) specific absorption rate (SAR) regulations. For example, FCC SAR regulations dictate that the electronic device 100 must reduce output power levels in the presence of a human body. The effect of reduced power levels may lead to a connection interruption. Accordingly, the output power levels can be decreased to meet FCC SAR regulations.

In one embodiment, the electronic device 100 can use the second strip element 114 to determine when to back off power when the electronic device 100 is transmitting data. For example, the electronic device 100 can measure a capacitance of the second strip element 114 to determine an SAR value. When the SAR value exceeds a threshold value, the electronic device can back off a transmission power of one or more of the first and second strip elements 12 and 116. In another embodiment, the electronic device 100 can use the first strip element 112 and the third strip element 116 to determine if an object is approximate the top edge 126 of the electronic device, such as when a user is gripping the top edge 126 of the electronic device 100, and can switch from using the first strip element 112 as a first antenna to using the third strip element 116 as the first antenna 112, or vice versa. One advantage of using the second strip element 114 as a capacitive sensing proximity sensor is that the capacitive sensing proximity sensor is a relatively low power consumption sensor.

In another embodiment, the electronic device 100 can measure a capacitance of the second strip element 114 to determine a proximity of the object 310 when the object is within a first distance of the electronic device can measure a capacitance of the first strip element 112 and the third strip element 116 to determine a proximity of the object 310 when the object is within a second distance of the electronic device. In one example, the first distance can be when the object 310 is less than 3 mm from the electronic device, e.g., a near distance. In another example, the second distance can be when the object 310 is between than 3 mm and 10 mm in distance from the electronic device, e.g., a far distance. In another example, the second distance can be when the object 310 is between than 7 mm and 10 mm in distance from the electronic device, e.g., a far distance. In one example, the electronic device 100 can switch antennas when the object is within the first distance and perform a power back off when the object is with a second distance. In another embodiment, the electronic device 100 can use the first strip element 112, the second strip element 114, and the third strip element 116 to determine that the object 310 is within a threshold proximity and perform a power back off. For example, the electronic device 100 can determine that the capacitance value of the second strip element 114 exceeds a threshold value and reduce a power transmission level to reduce an SAR of an object. The threshold value can be a specified capacitance value associated with a specified distance away from the second strip element 114.

Figure 3B:
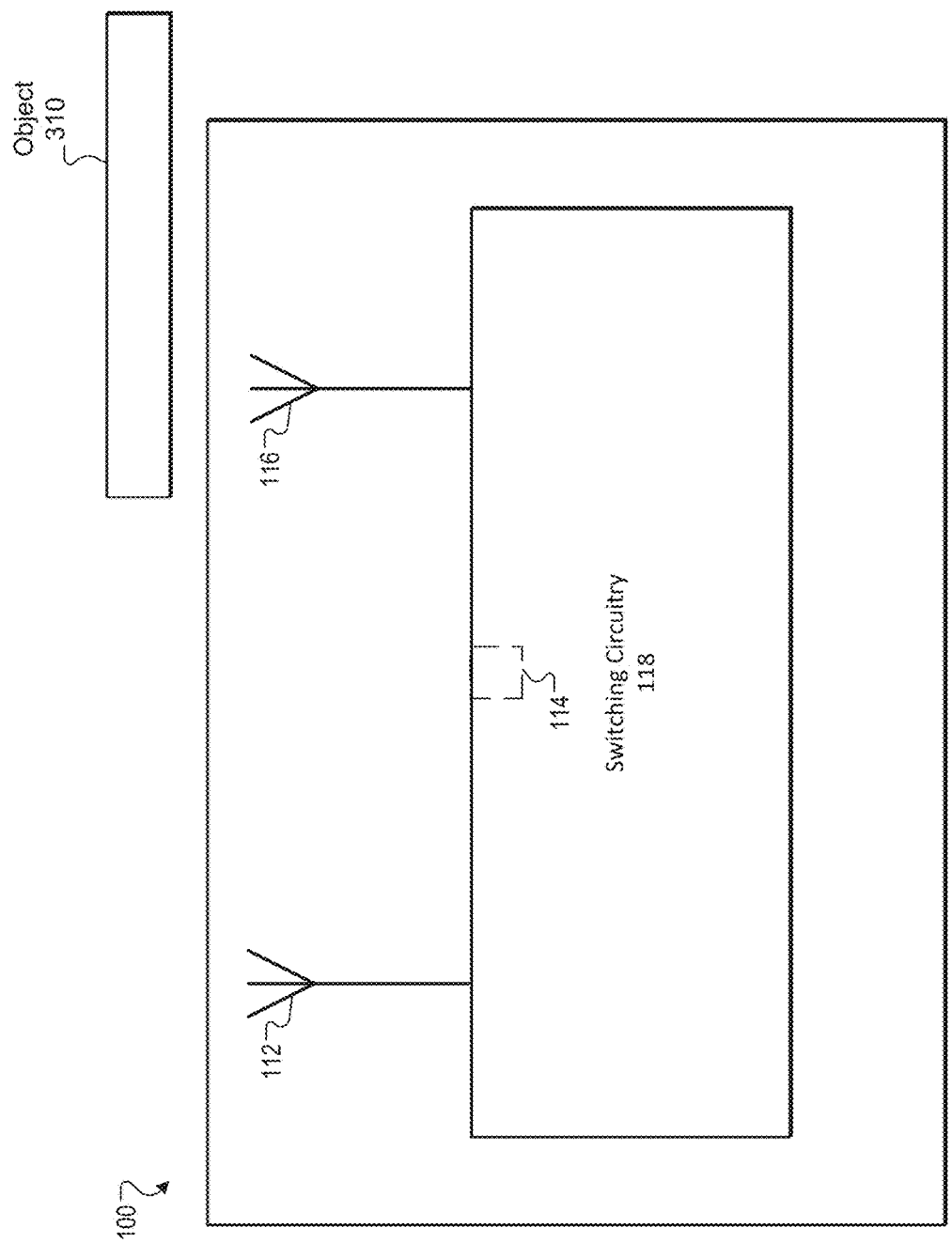
FIG. 3B illustrates the electronic device switching between the first antenna and a second antenna according to one embodiment.

FIG. 3B illustrates the electronic device 100 switching between the first antenna 112 and a second antenna 116 according to one embodiment. Some numbers in FIG. 3B are similar to some numbers in FIGS. 1 and 3A as noted by similar reference numbers unless expressly described otherwise.

In one embodiment, the electronic device 100 can use the first antenna 112, the second strip element 114, the second antenna 116, or a combination thereof to determine when the object 310 may be opposite or adjacent the electronic device 100. In one example, the object 310 can be a material that interferes with a signal communicated between the electronic device 100 and another device. For example, the material may be a metal material, a wood material, or a glass material. In response to the electronic device 100 determining that the object 310 may be adjacent to the second antenna 116, the electronic device 100 can switch to using the first antenna 112. The first antenna 112 and/or the second antenna 116 may be a dipole antenna, a monopole antenna, a folded antenna, a loop antenna, and so forth.

In one example, the electronic device can use the second antenna 116 as a capacitive sensor to determine a proximity of the object 310 to the second antenna 116. In another embodiment, the electronic device 100 can use the first antenna 112, the second strip element 114, or the second antenna 116 as a capacitive sensor can be done between a single electrode and the circuit common ground (self-capacitance). In another embodiment, the electronic device 100 can use a combination of the first antenna 112, the second strip element 114, and the second antenna 116 as mutual capacitance sensors, where two or more of the first antenna 112, the second strip element 114, and the second antenna 116 are two electrodes (e.g., mutual capacitance).

In one example, the electronic device 100 can dynamically switch between the first antenna 112 and the second antenna 116. A number of the antennas the electronic device 100 can switch between is not intended to be limiting. For example, the electronic device 100 can switch between two antennas, three antennas, four antennas, and so forth. For dynamic switching, the electronic device 100 can monitor signal values, as discussed in greater detail in the proceeding paragraphs. The signal values can be reference signal received power (RSRP) values, received signal code power (RSCP) values, or received signal strength indicator (RSSI) values, or signal to noise ratio (SNR) values for the first antenna 112 and/or the second antenna 116. The electronic device 100 can select the first antenna 112 or the second antenna 116 with a lowest signal value. For example, the first antenna 112 can have a lower signal value than the second antennas 116 because of the proximity of the object 310 relative to the second antenna 116. In this example, a higher signal value for the first antenna 112 can indicate that the object 310 may be a greater distance away from the first antenna 112 than from the second antenna 116.

In one example, the electronic device 100 can include a third antenna. The electronic device 100 can statically switch between the first antenna 112, the second antenna 116, and the third antenna. For static switching, when the electronic device 100 determines that the object 310 may be adjacent to the first antenna 112, the electronic device 100 can randomly select the second antenna 116 or the third antenna to communicate data to. In this example, the electronic device 100 can periodically check the signal value of the second antenna 116 or the third antenna that is being used to transmit and can switch back to the first antenna 112 when a signal value for the second antenna 116 of the third antenna decreases below a threshold value.

In another example, the electronic device 100 can select the first antenna 112, second antenna 116, or the third antenna with a highest signal value. An advantage of the electronic device 100 using the antenna with the highest signal value can be to use the antenna without a deteriorated performance because of the proximity of the object 310.

The electronic device 100 can check the signal values of the first antenna 112 and the second antenna 116 on a continuous or semi-continuous basis. In another example, the electronic device 100 can check the signal value of the first antenna 112 and the second antenna 116 on a periodic basis. In another example, the electronic device 100 can determine when to switch between the first antenna 112 and the second antenna 116 to reduce or avoid a loss of signal or data. For example, a loss of signal caused by the object 310 can be avoided by maintaining the signal value above a threshold amount. The electronic device 100 can monitor and switch between the first antenna 112 and second antenna 116 using firmware and/or software.

In one embodiment, the electronic device 100 can include a switching circuitry 118 to switch between the first antenna 112 and the second antenna 116. The switching circuitry 118 can include a general purpose input/output (GPIO) interface or a universal serial bus (USB) interface coupled to a modem of the electronic device 100. An application processor, such as a system on a chip (SoC), can send signal values to the modem and the modem can determine whether to switch antennas. For example, the signal values can indicate a state of a proximity sensor based on a channel (CH) input algorithm. The switching circuitry 118 can receive switch settings for switches to select the first antenna 112 or the second antenna 116 via the general-purpose input/output (GPIO) or a universal serial bus (USB) interface. In one example, when the switching circuitry 118 receives the switch settings from the modem, the switching circuitry 118 can toggle a double-pole, double-throw (DPDT) between the first antenna 112 (e.g., a first switch position) and the second antenna 116 (e.g., a second switch position) to select the first or second antenna 112 or 116 to transmit or receive a signal. In another embodiment, the switching circuitry 118 can include a single-pole, double throw (SPDT) to switch between the first antenna 112 and the second antenna 116 for antenna diversity, as discussed in greater detail in the proceeding paragraphs.

In one example, a user can place the electronic device 100 on the object 310, such as a table. When the electronic device 100 may be placed on the table, a performance of a current antenna (such as the second antenna 116) that the electronic device 100 uses to communicate data may be compromised or reduced due to signal interference by the object 310. The electronic device 100 can use the switching circuitry 118 to switch to the first antenna 112 that may be farther away from the table. An advantage of switching to the first antenna 112 that may be farther from object 310 can be to maintain a threshold level of antenna performance and reduce an environmental impact on the antenna performance.

The switching circuitry 118 can use the first antenna 112, the second strip element 114, and the second antenna 116 separately or in combination to perform proximity sensing. The switching circuitry 118 can use a switching algorithm to determine which of the first antenna 112, the second strip element 114, and the second antenna 116 to use for proximity sensing and which of the first or second antennas 112 and 116 to use to transmit or receive data. In one example, the switching algorithm can use the second strip element 114 to identify power back-off state of the electronic device 100. In another example, the electronic device 100 can use the first antenna 112, the second strip element 114, and the second antenna 116 to select the first antenna 112 or the second antenna 116 for transmitting data.

Figure 4A:
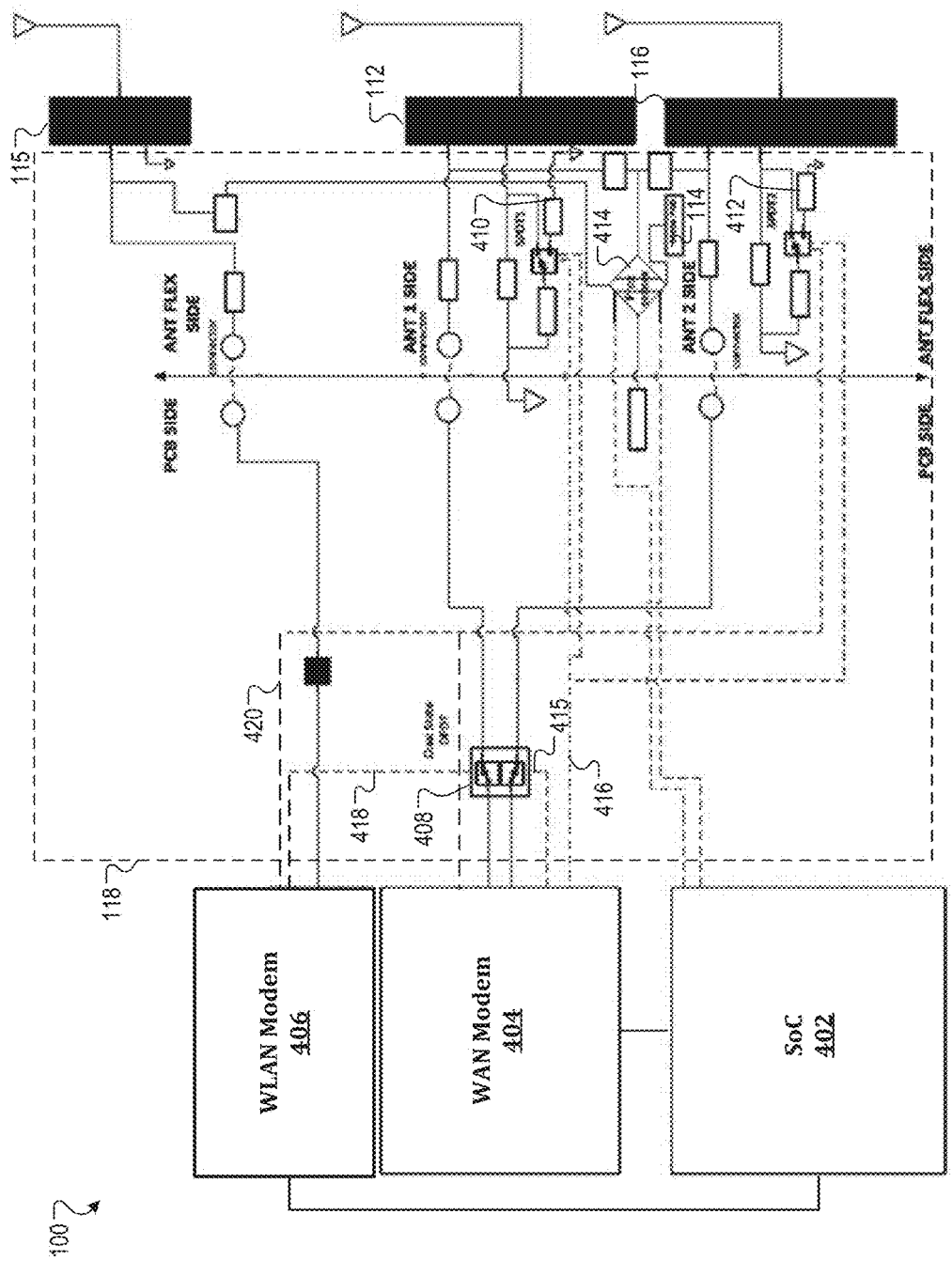
FIG. 4A illustrates an electronic device include a switching circuitry with a first switch configuration according to one embodiment.

FIG. 4A illustrates an electronic device 100 that includes a switching circuitry 118 in a first switch configuration according to one embodiment. Some numbers in FIG. 4A are similar to some numbers in FIGS. 1, 3A, and 3B as noted by similar reference numbers unless expressly described otherwise. The electronic device 100 can include a system on a chip (SoC) 402, a wireless area network (WAN) modem 404, a WLAN modem 406, the switching circuitry 118, the first antenna 112, the WLAN loop antenna 115, and the second antenna 116. In one embodiment, the first antenna 112 and the second antenna 116 can be coupled to the WAN modem 404 and the WLAN modem 406 with an radio frequency (RF) feed line. In one example, the first antenna 112 and the second antenna 116 can receive signals for transmission from the WAN modem 404 or the WLAN modem 406 via the RF feed line. In another example, the first antenna 112 and the second antenna 116 can send signals received from another device to the WAN modem 404 or the WLAN modem 406 via the RF feed line. In one embodiment, the WAN modem 404, the WLAN modem 406, and the SoC 402 can be integrated together on common carrier substrate, a single circuit (such as RF circuitry or an RF radio) or chipset. In another embodiment, the WAN modem 404 and the WLAN modem 406 can be digital modems executed on the SoC 402. In another embodiment, the WAN modem 404 and/or the WLAN modem 406 can include a transceiver circuit to send and receive signals. In another embodiment, the WAN modem 404 and/or the WLAN modem 406 can include a digital modem and a signal mixer.

The switching circuitry 118 can include a dual pole dual throw (DPDT) switch 408, a first single pole dual throw (SPDT) switch 410, a second SPDT switch 412, and the second strip element 114. The SoC 402 can use the first antenna 112, the second antenna 116, the second strip element 114, a proximity sensor 414, or a combination thereof to take proximity measurements. In one example, the proximity sensor 414 can be a Doppler Effect sensor, an inductive sensor, an optical sensor, a photocell sensor, a radar sensor, a sonar sensor, an ultrasonic sensor, a fiber optics sensor, a Hall Effect sensor, and so forth. In another example, the proximity sensor 414 can be coupled to the second strip element 114, and can use the second strip element 114 as an electrode for proximity sensing.

The SoC 402 can send proximity measurement values for the proximity measurements to the WAN modem 404 or the WLAN modem 406. In one example, when the electronic device 100 is communicating on a WLAN network, the SoC can send the proximity measurement values to the WLAN modem 406. In another example, when the electronic device 100 is communicating on a cellular network, the SoC can send the proximity measurement values to the WAN modem 404.

The WAN modem 404 or the WLAN modem 406 can use the proximity measurement values to determine switch settings for the switching circuitry 118 and send the switching circuitry 118 switch settings, as discussed in greater detail in the proceeding paragraphs. In one example, when the WAN modem 404 or the WLAN modem 406 determines that the object 310 is in proximity to the first antenna 112, the WAN modem 404 or the WLAN modem 406 can send switch settings to the switching circuitry 118 to switch the first SPDT switch 410 to a ground position (e.g., deactivating or disengaging the first antenna 112) and switch the second SPDT switch 412 to activate the second antenna 116.

In another embodiment, the WAN modem 404 or the WLAN modem 406 can use the proximity measurement values to determine when an absorption of energy radiated from the first antenna 112 and/or the second antenna 116 to the object 310 exceeds a threshold level, such as exceeding an SAR threshold level. When the WAN modem 404 or the WLAN modem 406 determines that the energy radiation level exceeds the threshold level, the WAN modem 404 or the WLAN modem 406 can send a switch setting to the switching circuitry 118 to turn off the first antenna 112, the WLAN loop antenna 115, and/or the second antenna 116 to reduce the amount of energy radiating from the electronic device 100. In one example, the WAN modem 404 can use a first bias line 415 to control the DPDT switch 408 and a second bias line 416 to control the first SPDT switch 410 and the second SPDT switch 412. In another example, the WLAN modem 406 can use a third bias line 418 to control the DPDT switch 408 and a fourth bias line 420 to control the first SPDT switch 410 and the second SPDT switch 412.

Figure 4B:
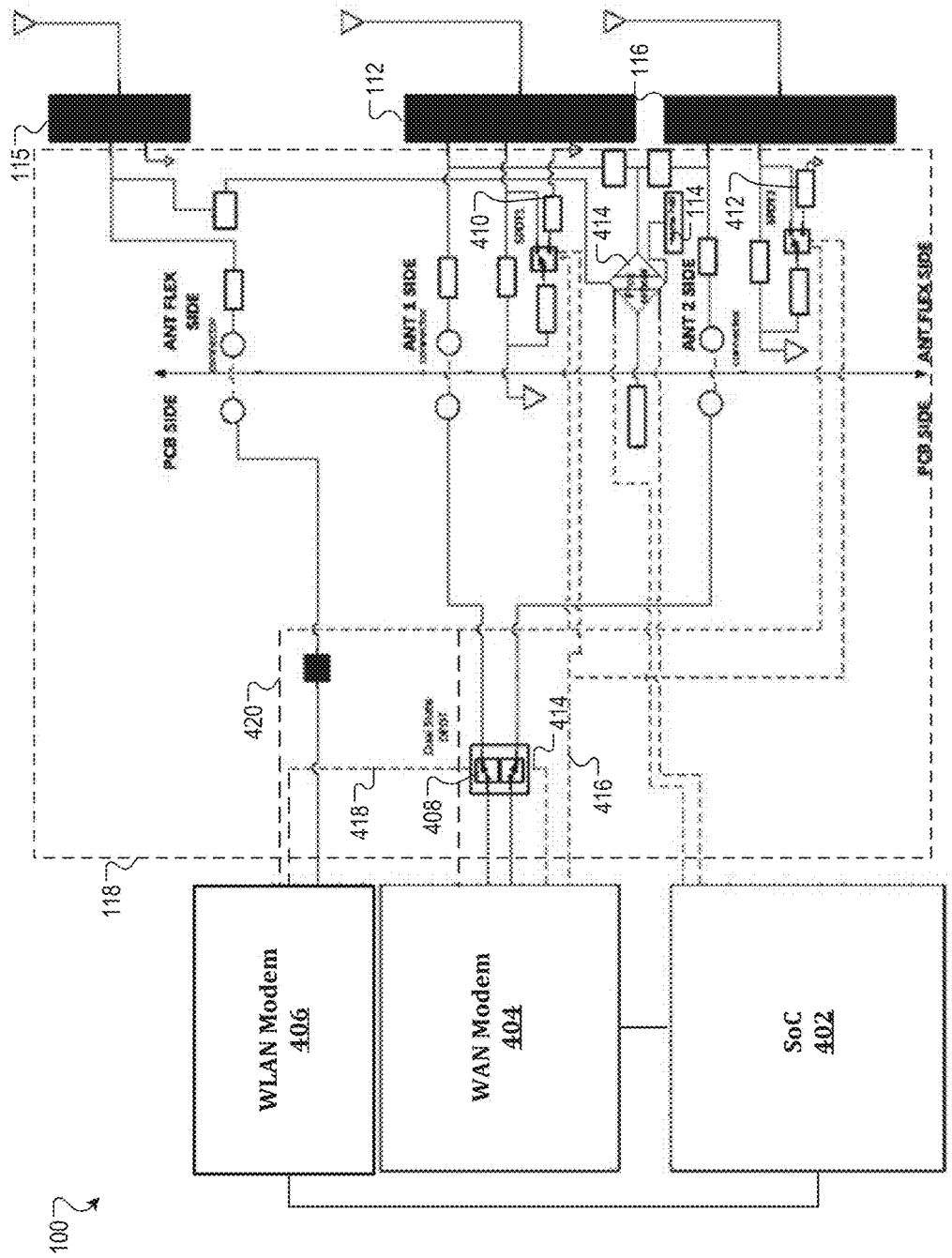
FIG. 4B illustrates the switching circuitry with a second switch configuration according to one embodiment.

FIG. 4B illustrates the switching circuitry 118 with a second switch configuration according to one embodiment. Some numbers in FIG. 4B are similar to some numbers in FIGS. 1, 3A, 3B, and 4A as noted by similar reference numbers unless expressly described otherwise. FIG. 4A illustrates the DPDT switch in a first setting position to use the first antenna 112 as a primary antenna and the second antenna 116 as a diversity antenna. FIG. 4B illustrates the DPDT switch 408 in a second setting position to use the first antenna 112 as a diversity antenna and the second antenna 116 as a primary antenna.

FIG. 4C illustrates a decision table 430 that the WAN modem 404 or the WLAN modem 406 can use to determine switch settings for the switching circuitry 118 according to one embodiment. The electronic device 100 can be configured to communicate on different communications networks. In one example, the electronic device 100 can communicate at 2.4 gigahertz (GHz) frequency or 5 GHz frequency using an 802.11b/g/n communication standard for a WLAN network. In one embodiment, the WLAN modem 406 can be configured to use the first antenna 112 as a transmitting antenna and the second antenna 116 as a receiving antenna (i.e., a 1×1 antenna configuration), or vice versa. In another embodiment, the WLAN modem 406 can be configured to use the first antenna 112 as a first transmitting and receiving antenna and the second antenna 116 as a second transmitting and receiving antenna (i.e., a 2×2 antenna configuration). In another example, the electronic device 100 can communicate at an 800 megahertz (MHz) frequency or a 1900 MHz frequency using a 2G/3G/4G communication standard for a cellular network. In another example, the electronic device 100 can communicate at a 700 MHz frequency, a 1700-2100 MHz frequency, a 1900 MHz frequency, or a 2500-2700 MHz frequency range using a long term evolution (LTE) communication standard for a cellular network. In another example, the electronic device 100 can use the first antenna 112 and the second antenna 116 to receive or transmit signals along different propagation paths, i.e., antenna diversity.

In one embodiment, the WAN modem 404 or the WLAN modem 406 can use the decision table 430 to determine when to use the first antenna 112 or the second antenna 116 for communication. The decision table 430 can be a Karnaugh Map. The decision table 430 can include switch settings for the switching circuitry 118 when the electronic device 100 communicates on the different communications networks.

The rows 432-444 in the decision table 430 can include: a communications networks row 432 indicating different communications networks used by the electronic device 100; a first antenna 112 row indicating different configurations of the first antenna 112 for the communications networks in the communications networks row 432; a second antenna 116 row indicating different configurations of the second antenna 116 for the communications networks in the communications networks row 432; a WLAN loop antenna 115 row indicating different configurations of WLAN loop antenna 115 for the communications networks in the communications networks row 432; a DPDT switch setting row 440 indicating a setting for the DPDT switch 408 in the switching circuitry 118 for the communications networks in the communications networks row 432; a first SPDT switch setting row 442 indicating a setting for the first SPDT switch 410 in the switching circuitry 118 for the communications networks in the communications networks row 432; and a second SPDT switch setting row 444 indicating a setting for the second SPDT switch 412 in the switching circuitry 118 for the communications networks in the communications networks row 432.

The column 446-454 in the decision table 430 can include: a first LTE network column 446 indicating the configuration for a first LTE network of the first antenna 112, the second antenna 116, the WLAN loop antenna 115, the DPDT switch 408, the first SPDT switch 410, and the second SPDT switch 412; a second LTE network column 448 indicating the configuration for a second LTE network of the first antenna 112, the second antenna 116, the WLAN loop antenna 115, the DPDT switch 408, the first SPDT switch 410, and the second SPDT switch 412; a first 2G or 3G network column 450 indicating the configuration for a first 2G or 3G network of the first antenna 112, the second antenna 116, the WLAN loop antenna 115, the DPDT switch 408, the first SPDT switch 410, and the second SPDT switch 412; a second 2G or 3G network column 452 indicating the configuration for a second 2G or 3G network of the first antenna 112, the second antenna 116, the WLAN loop antenna 115, the DPDT switch 408, the first SPDT switch 410, and the second SPDT switch 412; and a WLAN network column 454 indicating the configuration for a WLAN network of the first antenna 112, the second antenna 116, the WLAN loop antenna 115, the DPDT switch 408, the first SPDT switch 410, and the second SPDT switch 412.

In one example, the first LTE network column 446 can include setting the first antenna 112 as a primary antenna, the second antenna 116 as a diversity antenna, the WLAN loop antenna 115 is inactive, the DPDT switch 408 as high, the first SPDT switch 410 as high, and the second SPDT switch 412 as high. In another example, the second LTE network column 448 can include setting the first antenna 112 as a diversity antenna, the second antenna 116 as a primary antenna, the WLAN loop antenna 115 is inactive, the DPDT switch 408 as low, the first SPDT switch 410 as high, and the second SPDT switch 412 as high. In another example, the first 2G or 3G network column 450 can include setting the first antenna 112 as active, the second antenna 116 as inactive, the WLAN loop antenna 115 is inactive, the DPDT switch 408 as high, the first SPDT switch 410 as high, and the second SPDT switch 412 as high. In another example, the second 2G or 3G network column 452 can include setting the first antenna 112 as inactive, the second antenna 116 as active, the WLAN loop antenna 115 as inactive, the DPDT switch 408 as low, the first SPDT switch 410 as low, and the second SPDT switch 412 as low. In another example, the WLAN network column 454 can include setting the first antenna 112 as inactive, the second antenna 116 as inactive, the WLAN loop antenna 115 as inactive. In this example, the setting of the DPDT switch 408, the first SPDT switch 410, and the second SPDT switch 412 can be set as high or low as the switches 408-412 are not in the path between the WLAN modem and the WLAN loop antenna 115 and do not affect the WLAN loop antenna 115.

Figure 4D:
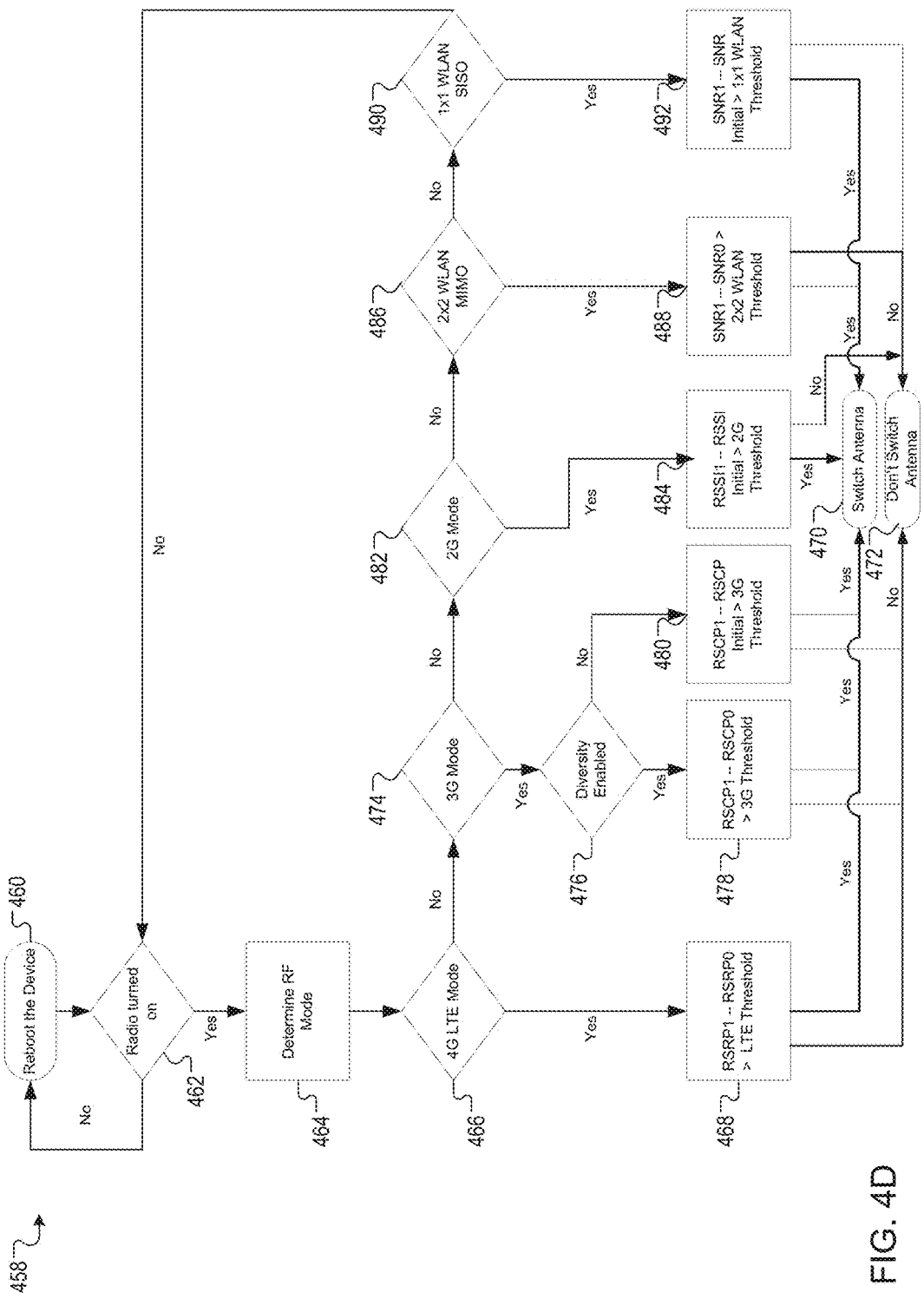
FIG. 4D illustrates a flowchart of an embodiment of a method of determining when to switch between the first antenna and the second antenna according to one embodiment.

FIG. 4D illustrates a flowchart of an embodiment of a method 458 of determining when to switch between the first antenna 112 and the second antenna 116 according to one embodiment. The method 458 may at least partially be performed by processing logic that includes hardware (e.g., circuitry, dedicated logic, programmable logic, microcode, etc.), software (e.g., instructions executed by a processing device), firmware or a combination thereof. The method 458 may be performed, at least in part, by the electronic device 100.

The method begins with booting or rebooting the electronic device 100 (460). For example, the electronic device 100 can be booted when a user turns on the electronic device 100. In another example, the electronic device 100 can be rebooted when the electronic device 100 has an error or malfunctions. The method can also include turning a radio on (462). The radio can be part of a communications system of the electronic device 100, where the communications system can include the WAN modem 404, the WLAN modem 406, the switching circuitry 118, the first antenna 112, the second antenna 114, and the WLAN loop antenna 115. In one example, turning the radio on can include connecting to a cellular or wireless communications network. The method can include rebooting the electronic device (460) when the radio is not turned on. The method can include determining a radio frequency (RF) mode of the electronic device 100 when the radio is turned on (464). In one example, the electronic device 100 can be set to automatically select a communications network, such as a 4G or WLAN network, that has the highest bandwidth available. In another example, the electronic device 100 can be set to automatically select a communications network that the electronic device 100 receives a strongest signal from. In another example, the electronic device 100 can be set to manually select a communications network based on a manufacturer or cellular network provider setting. In another example, the electronic device 100 can receive a RF mode message from another electronic device in the communication network, such as a base station, indicating which RF mode the electronic device 100 is to use to send and receive signals.

The electronic device can use different measurements to determine whether to switch antennas for the different RF modes, as discussed in greater detail in the proceeding paragraphs. In one embodiment, the electronic device 100 can use a received signal strength indicator (RSSI) measurement when communicating using a 2G or 3G communication standard. In another embodiment, the electronic device 100 can use a received signal code power (RSCP) when communicating using a wideband code division multiple access (WCDMA) or a code division multiple access (CDMA) communication standard. In another embodiment, the electronic device 100 can use a reference signal received power (RSRP) measurement, a signal to noise ratio (SNR) measurement, and/or a proximity sensor measurement when communicating using a long term evolution (LTE) communication standard.

To determine the RF mode, the method can include determining when the electronic device 100 is operating in a 4G or LTE mode to communicate using a 4G or LTE standard (466). When the electronic device 100 is operating in the 4G or LTE mode, the method can include determining if a first reference signal received power (RSRP) minus a second RSRP exceeds a 4G or LTE threshold (468). In one example, when the electronic device 100 is operating with a primary antenna and a diversity antenna, the first RSRP can be an RSRP measurement for an antenna that is the primary antenna and the second RSRP can be an RSRP measurement for an antenna that is the diversity antenna. In another example, when the electronic device is operating with an active antenna and an inactive antenna, the first RSRP can be an RSRP measurement for an antenna that is an active antenna and the second RSRP can be an RSRP measurement for an antenna that is an inactive antenna. In this example, the electronic device can take an RSRP measurement using the inactive antenna after the radio is turned on (462) and then set the antenna as inactive. The method can include continuing to use an antenna the electronic device is currently using for communication when the first RSRP minus the second RSRP does not exceed the 4G or LTE threshold (472). The method can include switching from current antenna the electronic device is currently using for communication to a different antenna when the first RSRP minus the second RSRP exceeds the 4G or LTE threshold (470).

When the electronic device 100 is not operating in the 4G or LTE mode, the method can include determining whether the electronic device 100 is operating in a 3G mode to communicate using a 3G communication standard (474). When the electronic device 100 is operating in the 3G mode, the electronic device can determine whether the electronic device 100 has diversity enabled (476). When diversity is enabled, the method can include determining whether a received signal code power (RSCP) minus a second RSCP exceeds a 3G threshold (478). In one example, when the electronic device 100 is operating with a primary antenna and a diversity antenna, the first RSRP can be an RSRP measurement for an antenna that is the primary antenna and the second RSRP can be an RSRP measurement for an antenna that is the diversity antenna. When diversity is not enabled, the method can include determining whether a current received signal code power (RSCP) minus an initial RSCP exceeds a 3G threshold (480).

In one example, when the electronic device 100 is operating with an active antenna and an inactive antenna (e.g., no antenna diversity), the current RSRP can be an RSRP measurement for an antenna that is an active antenna and the initial RSRP can be an RSRP measurement for an antenna that is an inactive antenna. In this example, the electronic device can take an RSRP measurement using the inactive antenna after the radio is turned on (462) and then set the antenna as inactive. The method can include continuing to use the antenna the electronic device is currently using for communication when the first or current RSRP minus the second or initial RSRP does not exceed the 3G threshold (472). The method can include switching a current antenna that the electronic device 100 is currently using for communication to a different antenna when the current or first RSRP minus the initial or second RSRP exceeds the 3G threshold (470).

When the electronic device 100 is not operating in the 3G mode, the method can include determining whether the electronic device 100 is operating in a 2G mode to communicate using a 2G communication standard (482). When the electronic device 100 is operating in the 2G mode, the method can include determining if a first RSSI minus a second RSSI exceeds a 2G threshold (484). In one example, when the electronic device 100 is operating with an active antenna and an inactive antenna, the first RSSI can be an RSSI measurement for an antenna that is an active antenna and the initial RSSI can be an RSSI measurement for an antenna that is an inactive antenna. In this example, the electronic device 100 can take an RSSI measurement using the inactive antenna after the radio is turned on (462) and then set the antenna as inactive. The method can include continuing to use the antenna that the electronic device 100 is currently using for communication when the first RSSI minus the initial RSSI does not exceed the 2G threshold (472). The method can include switching a current antenna that the electronic device 100 is currently using for communication to a different antenna when the first RSSI minus the second RSSI exceeds the 2G threshold (470).

When the electronic device 100 is not operating in the 2G mode, the method can include determining whether the electronic device 100 is operating in a 2×2 WLAN multiple input multiple output (MIMO) mode to communicate using a WLAN communication standard (486). When the electronic device 100 is operating in the WLAN mode, the method can include determining if a first signal to noise ratio (SNR) minus a second SNR exceeds a 2×2 WLAN threshold (488). The method can include continuing to use an antenna the electronic device is currently using for communication when the first SNR minus the second SNR does not exceed the 2×2 WLAN threshold (472). The method can include switching the current antenna the electronic device is currently using for communication to a different antenna when the first SNR minus the second SNR exceeds the 2×2 WLAN threshold (470).

When the electronic device 100 is not operating in the 2×2 WLAN MIMO mode, the method can include determining whether the electronic device 100 is operating in a 1×1 WLAN single input single output (SISO) mode to communicate using a WLAN communication standard (490). When the electronic device 100 is operating in the 1×1 WLAN SISO mode, the method can include determining if a current SNR minus an initial SNR exceeds a 1×1 WLAN threshold (492). The method can include continuing to use the antenna the electronic device is currently using for communication when the current SNR minus the initial SNR does not exceed the 1×1 WLAN threshold (472). The method can include switching a current antenna the electronic device 100 is currently using for communication to a different antenna when the current SNR minus the initial SNR exceeds the 1×1 WLAN threshold (470). The LTE threshold, the 3G threshold, the 2G threshold, the 2×2 WLAN threshold, and the 1×1 WLAN threshold can be predetermined threshold values stored in a memory device of the electronic device 100. To determine the threshold LTE threshold, the 3G threshold, the 2G threshold, the 2×2 WLAN threshold, or the 1×1 WLAN threshold, the WLAN modem 406 or the WAN modem 404 can retrieve, from the memory device, the predetermined threshold values associated with the different RF modes. The memory device can be coupled to the WAN modem 404 or the WLAN modem 406

Figure 5A:
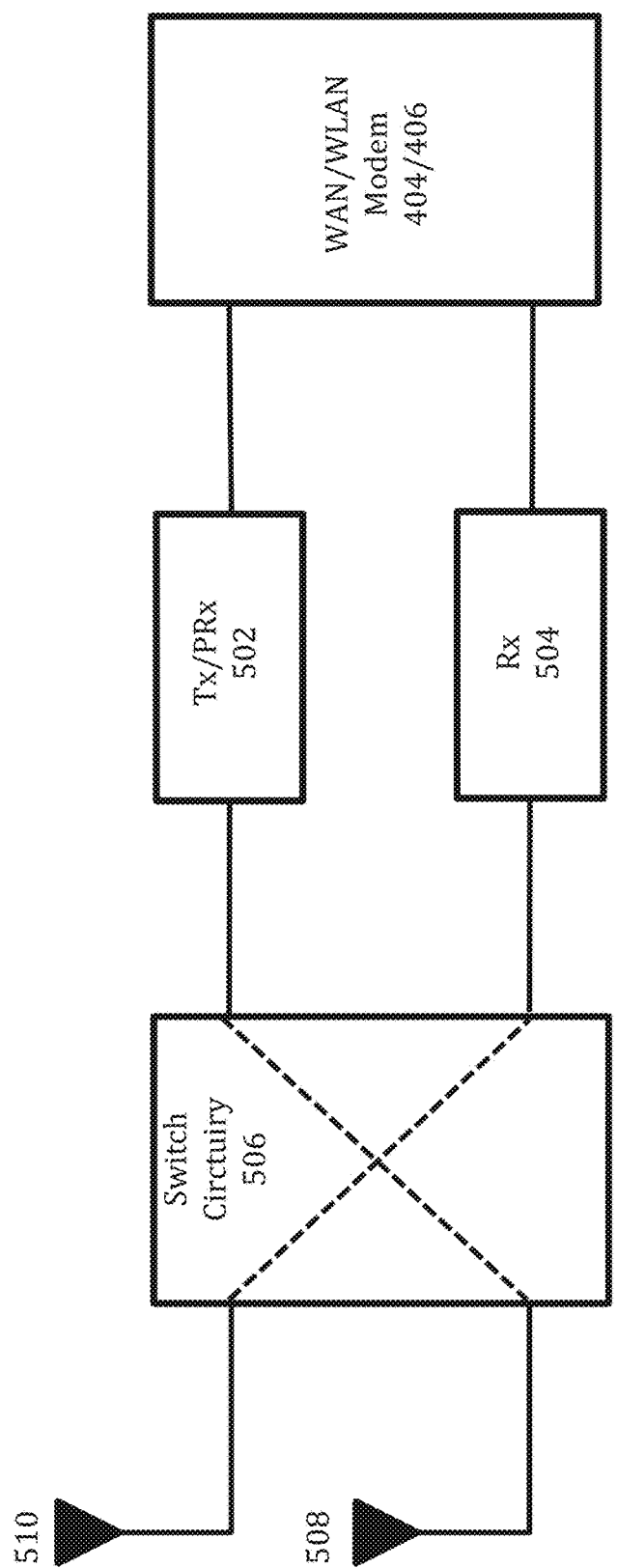
FIG. 5A illustrates the electronic device configured to communicate on a WLAN communications network, a LTE cellular network, or a 4G cellular network according to one embodiment.

FIG. 5A illustrates the electronic device 100 configured to communicate on a WLAN communications network, a LTE cellular network, or a 4G cellular network according to one embodiment. The electronic device 100 can include the WAN modem 404 or the WLAN modem 406 selecting a first antenna 508 to use as a primary antenna and a second antenna 510 to use as a diversity antenna. The electronic device 100 can include a Tx/PRx module 502 and an Rx module 504. In one embodiment, the Tx/PRx module 502 can include a predetermined condition that triggers the WAN modem 404 or the WLAN modem 406 to use the switch circuitry 506 to switch the first antenna 508 from a primary antenna to a diversity antenna and the second antenna 510 from a diversity antenna to a primary antenna. In another embodiment, the WAN modem 404 or the WLAN modem 406 use the first antenna 508 and the second antenna 510 to measure an RSRP or SNR of the first antenna 508 and the second antenna 510. The WAN modem 404 or the WLAN modem 406 can send the switch setting to the switch circuitry 506 to define the first antenna 508 as a primary antenna and the second antenna 510 as a diversity antenna.

Figure 5B:
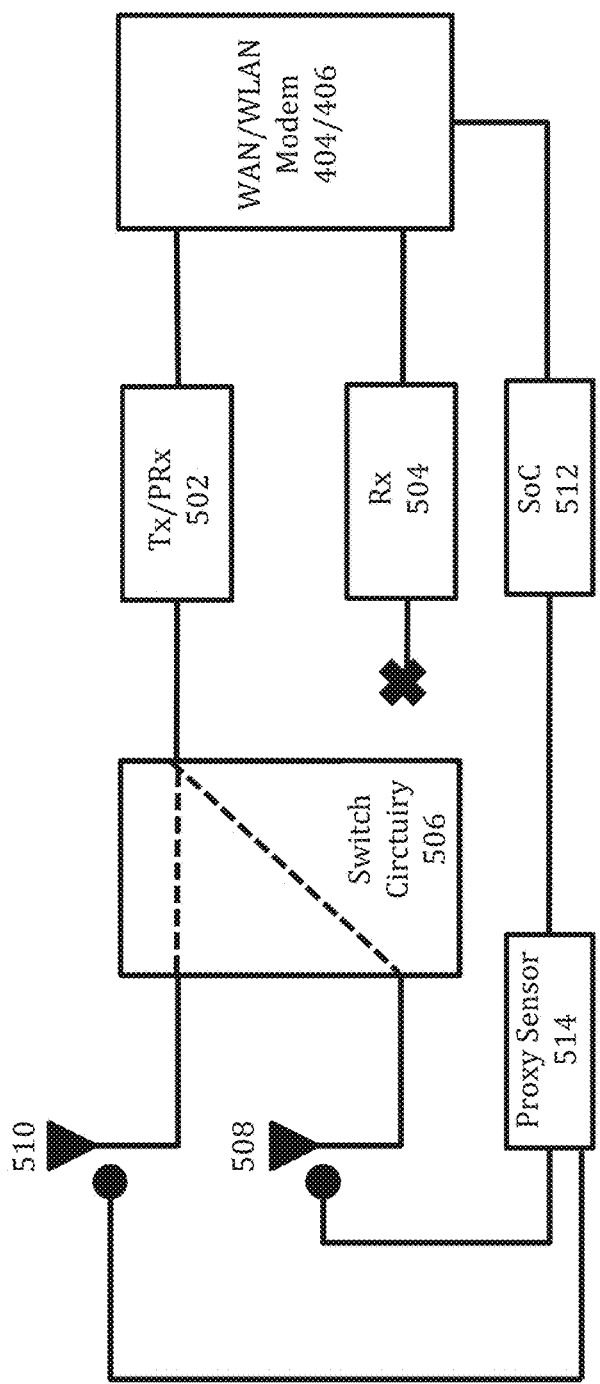
FIG. 5B illustrates the electronic device configured to communicate on a 3G cellular network or a 2G cellular network according to one embodiment.

FIG. 5B illustrates the electronic device 100 configured to communicate on a 3G cellular network or a 2G cellular network according to one embodiment. Some numbers in FIG. 5B are similar to some numbers in FIGS. 4A, 4B, and 5A as noted by similar reference numbers unless expressly described otherwise. The electronic device 100 can include the WAN modem 404 or the WLAN modem 406 to select a first antenna 508 to use as a primary antenna and a second antenna 510 to use as a diversity antenna. The electronic device 100 can include a SoC 512 that is coupled to the WAN modem 404 or the WLAN modem 406. The SoC 512 can use the first antenna 508, the second antenna 510, a proximity sensor 514, or a combination thereof to take proximity measurements. In one example, the SoC 512 can use the proximity sensor 514 to identify when the first antenna 508 or the second antenna 510 is blocked by a user grasping a hand grip of the electronic device 100. In this example, when the current active antenna is blocked by a hand of the user then the switching circuitry 506 can switch to a second antenna using a state table 512, as discussed in greater detail in the proceeding paragraphs. The SoC 512 can send proximity measurement values for the proximity measurements to the WAN modem 404 or the WLAN modem 406. The WAN modem 404 or the WLAN modem 406 can use the proximity measurement values to detect an object adjacent or opposite to the electronic device, the first antenna 508, or the second antenna 510.

Figure 5C:
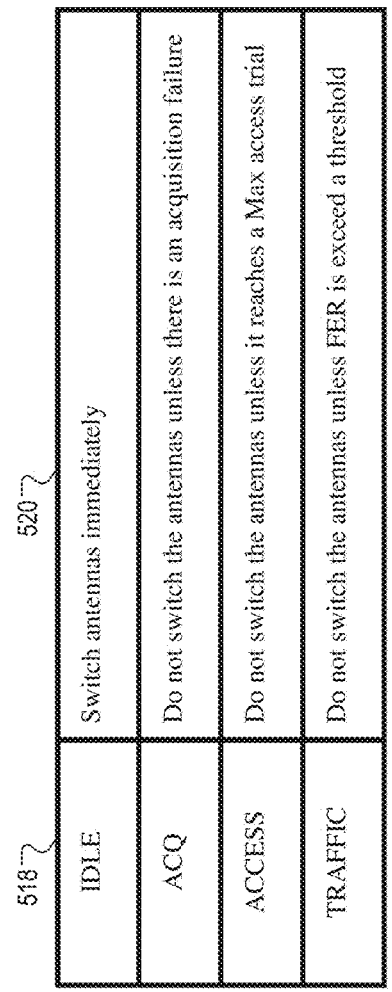
FIG. 5C illustrates the condition table for antenna switching according to one embodiment.

FIG. 5C illustrates the state table 516 for antenna switching according to one embodiment. The state table 516 can include a column of conditions 518 with associated actions 520 to switch between the antennas 508 and 510. The conditions 518 can be state conditions that the SoC 512 may enter. For example, when the SoC 512 enters an idle state, the SoC 512 can send an instruction to the WAN modem 404 or the WLAN modem 406 for the WAN modem 404 or the WLAN modem 406 to send a switch setting to the switch circuitry 506 to switch from using the first antenna 508 to the second antenna 510. In another example, when the SoC 512 enters an acquisition (ACQ) state to receive data, the SoC 512 can send an instruction to the WAN modem 404 or the WLAN modem 406 to continue using the current antenna. In another example, when the SoC 512 enters an access state to retrieve data, the SoC 512 can send an instruction to the WAN modem 404 or the WLAN modem 406 to continue using the current antenna. In another example, when the SoC 512 enters a traffic state where a high amount of data traffic is occurring between the electronic device 100 and another device, the SoC 512 can send an instruction to the WAN modem 404 or the WLAN modem 406 to continue using the current antenna.

Figure 6A:
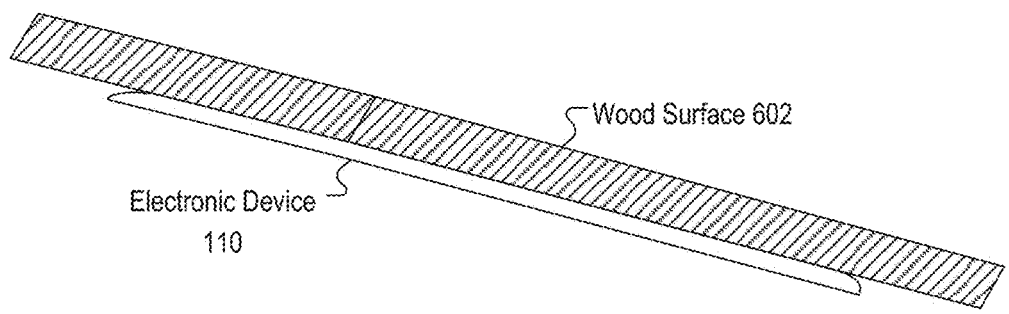
FIG. 6A illustrates an example of the electronic device in proximity to a wood surface according to one embodiment.
Figure 6B:
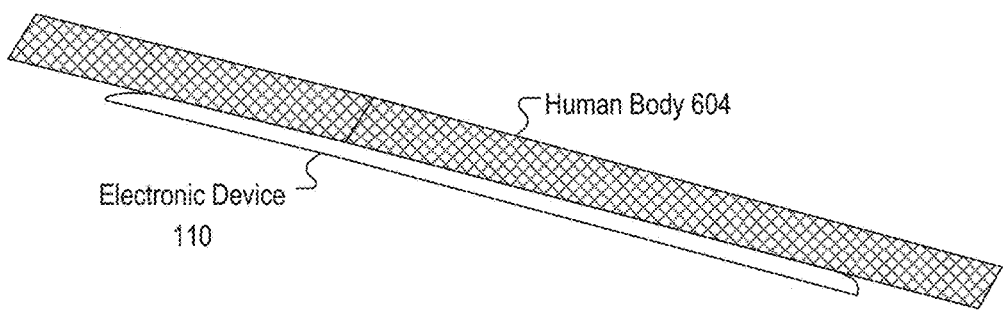
FIG. 6B illustrates an example of the electronic device in proximity to a human body part according to one embodiment.
Figure 6C:
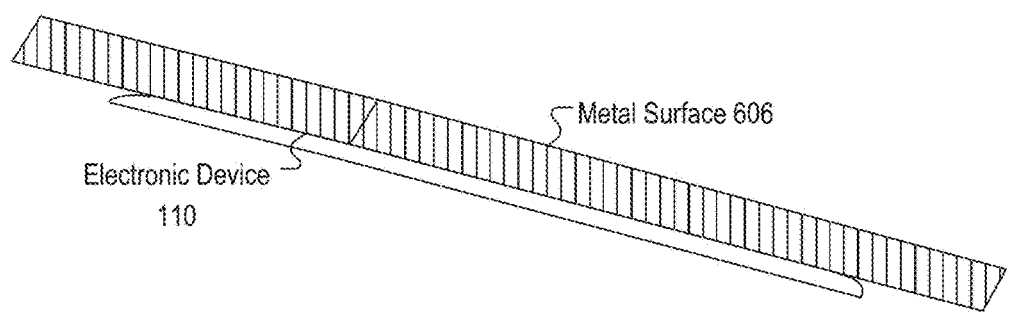
FIG. 6C illustrates an example of the electronic device in proximity to a metal surface according to one embodiment.
Figure 6D:
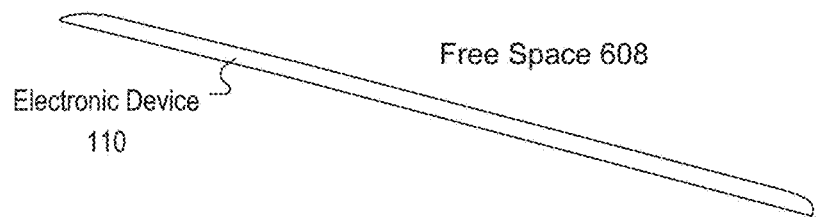
FIG. 6D illustrates an example of the electronic device in free space according to one embodiment.

FIGS. 6A-6D illustrate the electronic device 100 in proximity to different types of objects or surfaces 602-606 and free space 608. In particular, FIG. 6A illustrates an example of the electronic device 100 in proximity to a wood surface 602 according to one embodiment. FIG. 6B illustrates an example of the electronic device 100 in proximity to a human body part 604 according to one embodiment. It should be noted that human body part 604 is represented as a rectangular box for ease of illustration. Further, the size of the human body part 604 may vary in size, such as a hand holding the electronic device 100 or the electronic device 100 resting on a user's leg. FIG. 6C illustrates an example of the electronic device 100 in proximity to a metal surface 606 according to one embodiment. FIG. 6D illustrates an example of the electronic device 100 in free space 608 according to one embodiment. In the preceding examples, the electronic device 100 can detect the presence of the surfaces or objects 602, 604, and/or 606 in proximity to the electronic device 100 using the signal value.

Figure 7A:
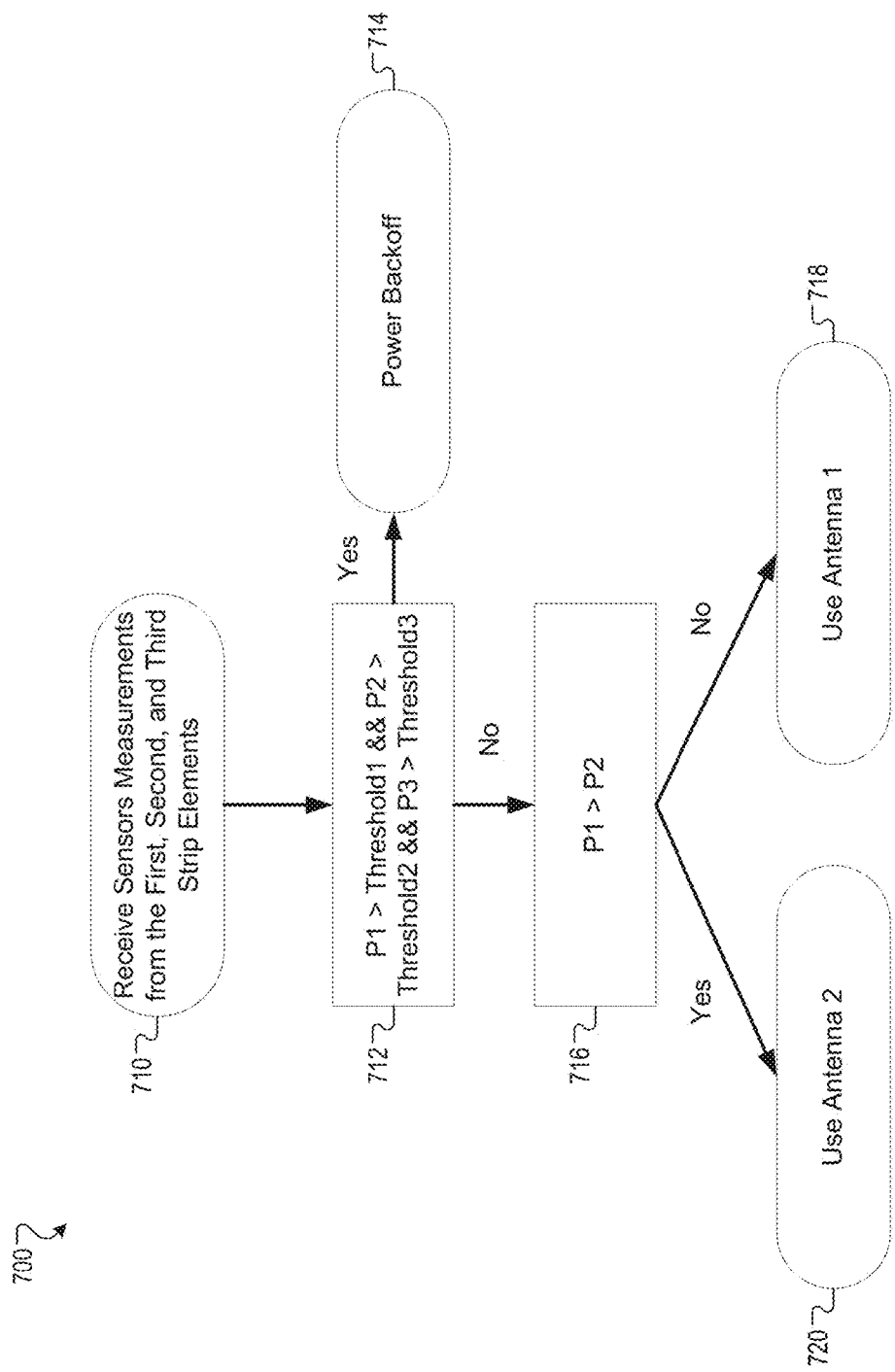
FIG. 7A illustrates a flowchart of an embodiment of a method of determining when to perform a power back off or to switch between the first strip element and the third strip element according to one embodiment.

FIG. 7A illustrates a flowchart of an embodiment of a method 700 of determining when to perform a power back off or to switch between the first strip element 112 and the third strip element 116 according to one embodiment. The method 700 may at least partially be performed by processing logic that includes hardware (e.g., circuitry, dedicated logic, programmable logic, microcode, etc.), software (e.g., instructions executed by a processing device), firmware or a combination thereof. The method 700 may be performed, at least in part, by the electronic device 100.

Referring to FIG. 7A, the method can begin with receiving, from a SoC, a first sensor measurement for the first strip element 112, a second sensor measurement for the second strip element 114, and a third sensor measurement for the third strip element 116 (710). The method can include determining, by a modem, whether to perform a transmission power back off, such as to mitigate a SAR regulation violation. In one example, the modem can determine whether to perform a transmission power back of by determining whether a value for the first sensor measurement (P1) exceeds a first threshold value, a value for the second sensor measurement (P2) exceeds a second threshold value, and a value for the third sensor measurement value (P3) exceeds a third threshold value (712). For example, the SoC can include proximity sensing circuitry to take the first, second, and third sensor measurements associated with the first, second and third strip elements 112-116. The method can include backing off, by the SoC, the transmission power when P1 does not exceed the first threshold value, P2 does not exceed the second threshold value, and P3 does not exceed the third threshold value (714). The method can include determining, by the modem, whether P1 is greater than P2 when P1 does not exceed the first threshold value, P2 does not exceed the second threshold value, and P3 does not exceed the third threshold value (716). The method can include using a first antenna when P1 is not greater than P2 (718). The method can include using a second antenna when p1 is greater than P2 (720).

Figure 7B:
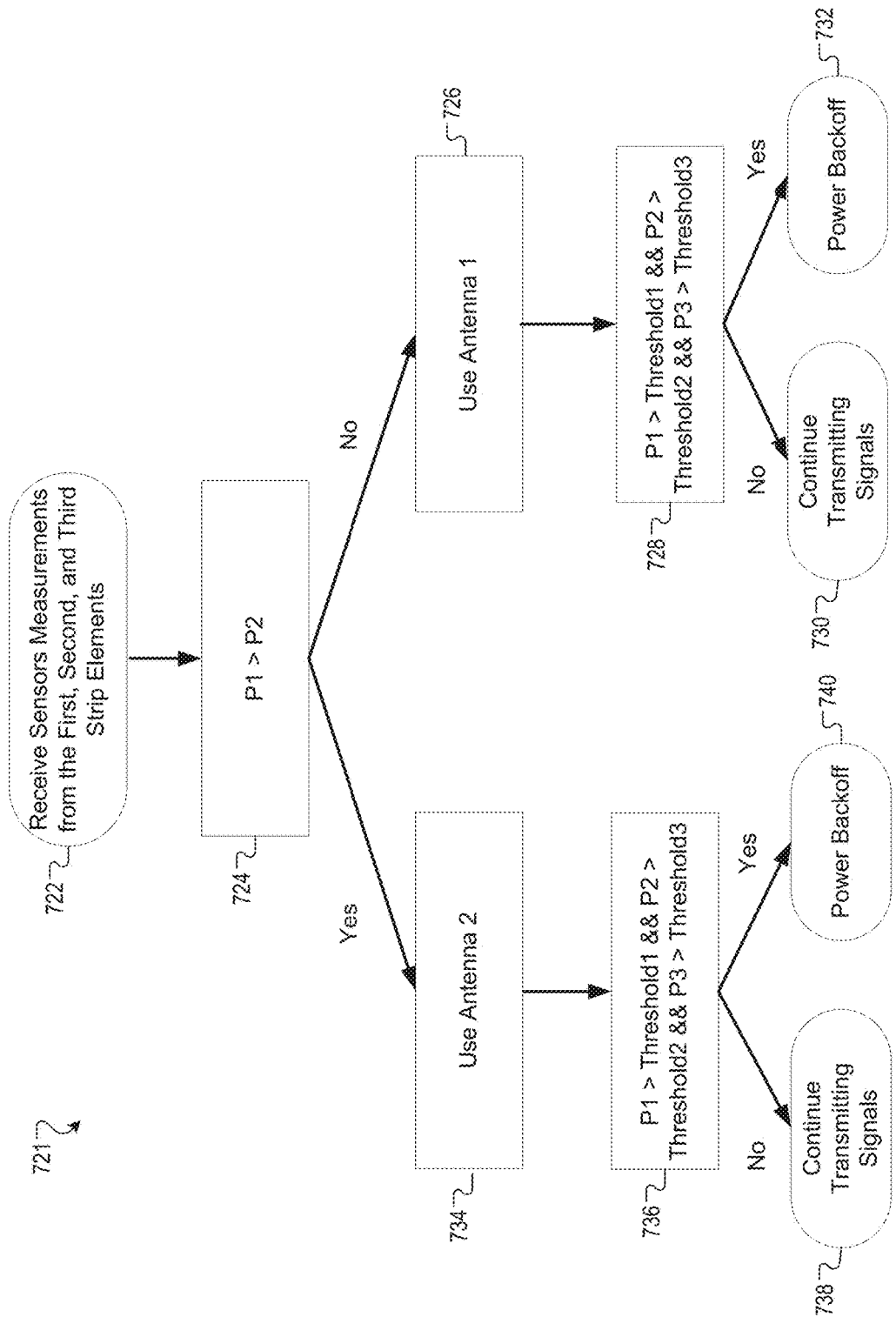
FIG. 7B illustrates a flowchart of an embodiment of another method of determining when to perform a power back off or to switch between the first strip element and the third strip element according to one embodiment.

FIG. 7B illustrates a flowchart of an embodiment of a method 721 of determining whether perform a power back off or to switch between the first strip element 112 and the third strip element 116 according to one embodiment. The method 721 may at least partially be performed by processing logic that includes hardware (e.g., circuitry, dedicated logic, programmable logic, microcode, etc.), software (e.g., instructions executed by a processing device), firmware or a combination thereof. The method 721 may be performed, at least in part, by the electronic device 100.

The method 721 can begin with receiving, from a SoC, a first sensor measurement value for the first strip element 112, a second sensor measurement value for the third strip element 116, and a third sensor measurement value for the third strip element 116 (722). The method can include determining, by a modem, whether to whether the first sensor measurement value (P1) is greater than a second sensor measurement value (P2) (724). The method can include the electronic device 100 using a first antenna 112 to transmit a signal when P1 is less than P2 (726). The method can include the modem can determine whether to perform a transmission power back of by determining whether the first sensor measurement value (P1) exceeds a first threshold value, the second sensor measurement value (P2) exceeds a second threshold value, and the third sensor measurement value (P3) exceeds a third threshold value (728). The method can include continuing to transmitting signals using the first antenna 112, by the modem, when P1 does not exceed the first threshold value, P2 does not exceed the second threshold value, or P3 does not exceed the third threshold value (730). The method can include performing a power back off, by the SoC, when P1 exceeds the first threshold value, P2 exceeds the second threshold value, and P3 exceeds the third threshold value (732).

The method can include the electronic device 100 using a second antenna 116 to transmit a signal when P1 is greater than P2 (734). The method can include the modem can determine whether to perform a transmission power back of by determining whether the first sensor measurement value (P1) exceeds a first threshold value, the second sensor measurement value (P2) exceeds a second threshold value, and the third sensor measurement value (P3) exceeds a third threshold value (736). The method can include continuing to transmitting signals using the second antenna 116, by the modem, when P1 does not exceed the first threshold value, P2 does not exceed the second threshold value, or P3 does not exceed the third threshold value (738). The method can include performing a power back off, by the SoC, when P1 exceeds the first threshold value, P2 exceeds the second threshold value, and P3 exceeds the third threshold value (740). An advantage of switching between the first antenna 112 and the second antenna 116 prior to performing the power back off can be to attempt to resolve an SAR regulation violation by switching antennas before backing off a transmission power.

Figure 8:
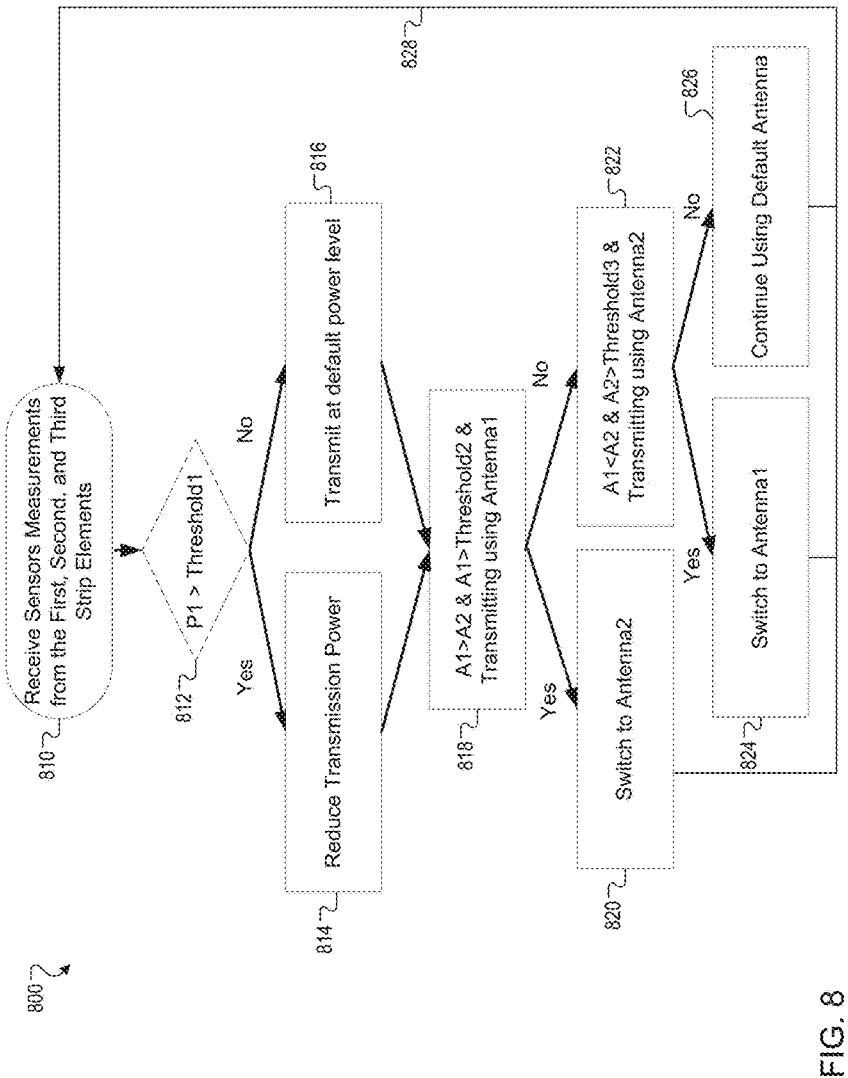
FIG. 8 illustrates a flowchart of an embodiment of a method of determining whether perform a power back off or to switch between the first strip element and the third strip element according to one embodiment.

FIG. 8C illustrates a flowchart of an embodiment of a method 800 of determining whether perform a power back off or to switch between the first antenna 112 and the second antenna 116 according to one embodiment. The method 800 may at least partially be performed by processing logic that includes hardware (e.g., circuitry, dedicated logic, programmable logic, microcode, etc.), software (e.g., instructions executed by a processing device), firmware or a combination thereof. The method 800 may be performed, at least in part, by the electronic device 100.

The method 800 can begin with receiving, from a SoC, a first measurement value for the first sensor measurement for the first strip element 112, a second measurement value for the second sensor measurement for the second strip element 114, and a third measurement value for third sensor measurement for the third strip element 116 (810). The method can include determining that a power transmission level of the antenna structure 110 exceeds a first threshold value (812). The method can include reducing a power transmission level of the antenna structure 110, by the SoC, when the power transmission level of the antenna structure 110 exceeds the first threshold value (814). The method can include continuing to transmit a signal via the antenna structure 110 at a default power transmission level when the power transmission level of the antenna structure 110 does not exceed the first threshold value (816). The method can include determining whether a first capacitance level of the first strip element 112 exceeds a second capacitance level of the third strip element 116, the first capacitance value exceeds a second threshold value, and the electronic device 100 is using the first strip element 112 to transmit signals (818). The second threshold value can be a specified capacitance value associated with a specified distance away from the first strip element 112, the second strip element 114, the third strip element 116 or the antenna structure 110. The method can include switching from using the first strip element 112 to using the third strip element 116 to transmit the signals when the first capacitance level of the first strip element 112 exceeds the second capacitance level of the third strip element 116, the first capacitance value exceeds the second threshold value, and the electronic device is currently using the first strip element 112 to transmit the signals (820). The method can include determining whether a first capacitance level of the first strip element 112 does not exceed a second capacitance level of the third strip element 116, the first capacitance value exceeds a third threshold value, and the electronic device 100 is using the third strip element 116 to transmit signals (822). The method can include switching from using the third strip element 116 to using the first strip element 112 to transmit the signals when the first capacitance level of the first strip element 112 does not exceed the second capacitance level of the third strip element 116, the first capacitance value exceeds the third threshold value, and the electronic device 100 is using the third strip element 116 to transmit signals (824). The method can include continuing to use the strip element 112 or 114 that the electronic device is using to transmit the signal when the when the first capacitance level of the first strip element 112 exceeds the second capacitance level of the third strip element 116, the first capacitance value does not the third threshold value, or the electronic device 100 is not using the third strip element 116 to transmit signals. (826). The method can include iteratively performing the method 850 while the electronic device 100 is transmitting one or more signals (828).

Figure 9:
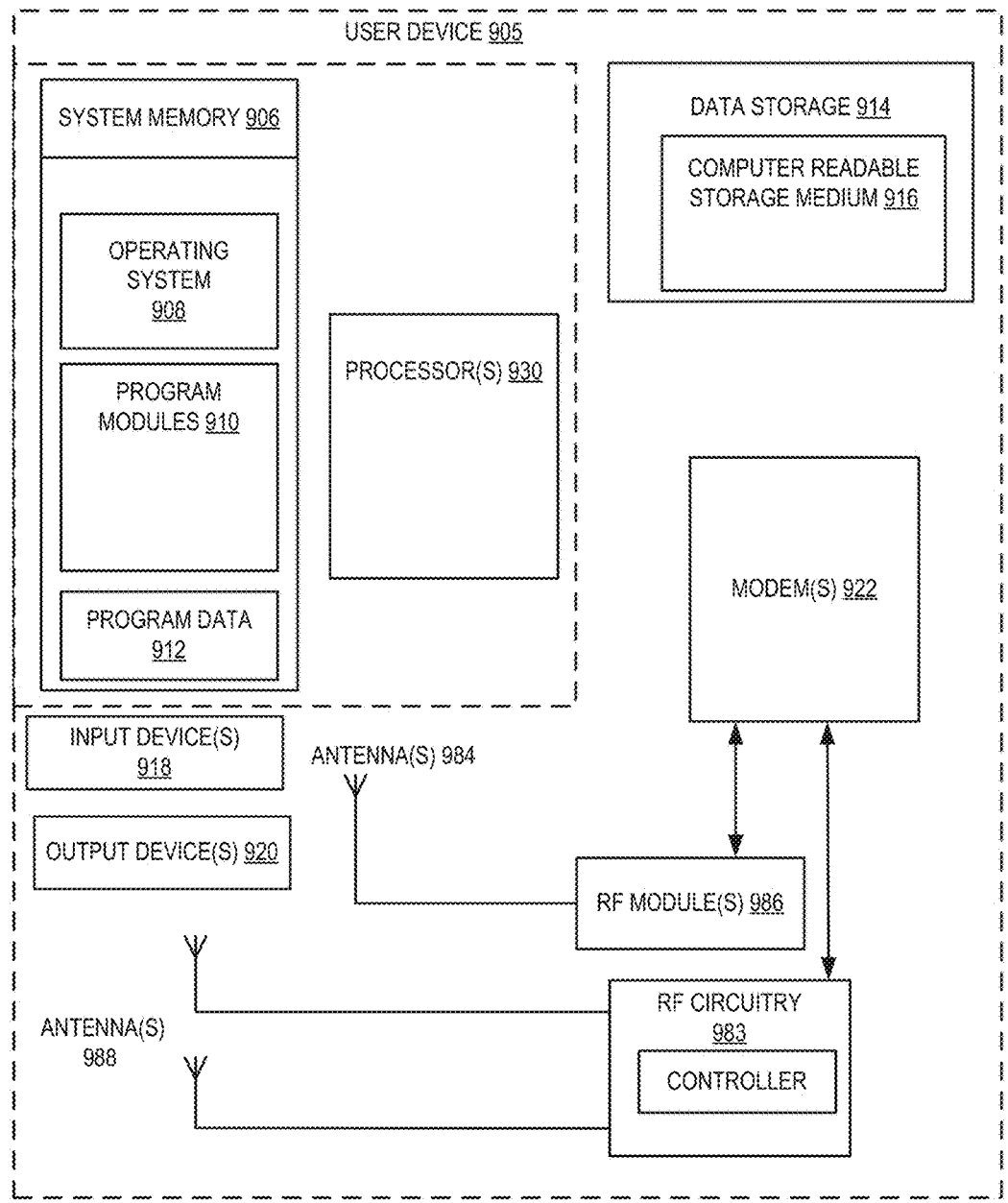
FIG. 9 is a block diagram of a user device in which embodiments of a radio device with an adaptive neutralization line may be implemented.

FIG. 9 is a block diagram of a user device 905 in which embodiments of a radio device switching between antennas 988 may be implemented. The user device 905 may correspond to the electronic device 100 of FIG. 1. The user device 905 may be any type of computing device such as an electronic book reader, a PDA, a mobile phone, a laptop computer, a portable media player, a tablet computer, a camera, a video camera, a netbook, a desktop computer, a gaming console, a DVD player, a computing pad, a media center, and the like. The user device 905 may be any portable or stationary user device. For example, the user device 905 may be an intelligent voice control and speaker system. Alternatively, the user device 905 can be any other device used in a WLAN network (e.g., WLAN network), a WAN network, or the like.

The user device 905 includes one or more processor(s) 930, such as one or more CPUs, microcontrollers, field programmable gate arrays, or other types of processors. The user device 905 also includes system memory 906, which may correspond to any combination of volatile and/or non-volatile storage mechanisms. The system memory 906 stores information that provides operating system component 908, various program modules 910, program data 912, and/or other components. In one embodiment, the system memory 906 stores instructions of the methods 458, 700, 721, 733, 800, and 821 as described herein. The user device 905 performs functions by using the processor(s) 930 to execute instructions provided by the system memory 906.

The user device 905 also includes a data storage device 914 that may be composed of one or more types of removable storage and/or one or more types of non-removable storage. The data storage device 914 includes a computer-readable storage medium 916 on which is stored one or more sets of instructions embodying any of the methodologies or functions described herein. Instructions for the program modules 910 may reside, completely or at least partially, within the computer-readable storage medium 916, system memory 906 and/or within the processor(s) 930 during execution thereof by the user device 905, the system memory 906 and the processor(s) 930 also constituting computer-readable media. The user device 905 may also include one or more input devices 918 (keyboard, mouse device, specialized selection keys, etc.) and one or more output devices 920 (displays, printers, audio output mechanisms, etc.).

The user device 905 further includes a modem 922 to allow the user device 905 to communicate via a wireless network (e.g., such as provided by the wireless communication system) with other computing devices, such as remote computers, an item providing system, and so forth. The modem 922 can be connected to RF circuitry 983 and zero or more RF modules 986. The RF circuit 983 may include a controller 985, as described herein. An adaptive neutralization line 160, as described herein is coupled between the antennas 988 and is coupled to the controller 983. The controller 983 controls the adaptive neutralization line 160 to reduce the mutual coupling between the antennas 988, which increase isolation between the antennas 988 as described herein. The RF circuitry 983 may be a WLAN module, a WAN module, PAN module, or the like. Antennas 988 are coupled to the RF circuitry 983, which is coupled to the modem 922. Zero or more antennas 984 can be coupled to one or more RF modules 986, which are also connected to the modem 922. The zero or more antennas 984 may be GPS antennas, NFC antennas, other WAN antennas, WLAN or PAN antennas, or the like. The modem 922 allows the user device 905 to handle both voice and non-voice communications (such as communications for text messages, multimedia messages, media downloads, web browsing, etc.) with a wireless communication system. The modem 922 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 922 may generate signals and send these signals to antenna 988, and 984 via RF circuitry 983 and RF module(s) 986 as descried herein. User device 905 may additionally include a WLAN module, a GPS receiver, a PAN transceiver and/or other RF modules. These RF modules may additionally or alternatively be connected to one or more of antennas 984, 988. Antennas 984, 988 may be configured to transmit in different frequency bands and/or using different wireless communication protocols. The antennas 984, 988 may be directional, omnidirectional, or non-directional antennas. In addition to sending data, antennas 984, 988 may also receive data, which is sent to appropriate RF modules connected to the antennas.

In one embodiment, the user device 905 establishes a first connection using a first wireless communication protocol, and a second connection using a different wireless communication protocol. The first wireless connection and second wireless connection may be active concurrently, for example, if a user device is downloading a media item from a server (e.g., via the first connection) and transferring a file to another user device (e.g., via the second connection) at the same time. Alternatively, the two connections may be active concurrently during a handoff between wireless connections to maintain an active session (e.g., for a telephone conversation). Such a handoff may be performed, for example, between a connection to a WLAN hotspot and a connection to a wireless carrier system. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna element and the second wireless connection is associated with a second antenna element. In other embodiments, the first wireless connection may be associated with a media purchase application (e.g., for downloading electronic books), while the second wireless connection may be associated with a wireless ad hoc network application. Other applications that may be associated with one of the wireless connections include, for example, a game, a telephony application, an Internet browsing application, a file transfer application, a global positioning system (GPS) application, and so forth.

Though a modem 922 is shown to control transmission and reception via antenna (984, 988), the user device 905 may alternatively include multiple modems, each of which is configured to transmit/receive data via a different antenna and/or wireless transmission protocol.

The user device 905 delivers and/or receives items, upgrades, and/or other information via the network. For example, the user device 905 may download or receive items from an item providing system. The item providing system receives various requests, instructions and other data from the user device 905 via the network. The item providing system may include one or more machines (e.g., one or more server computer systems, routers, gateways, etc.) that have processing and storage capabilities to provide the above functionality. Communication between the item providing system and the user device 905 may be enabled via any communication infrastructure. One example of such an infrastructure includes a combination of a wide area network (WAN) and wireless infrastructure, which allows a user to use the user device 905 to purchase items and consume items without being tethered to the item providing system via hardwired links. The wireless infrastructure may be provided by one or multiple wireless communications systems, such as one or more wireless communications systems. One of the wireless communication systems may be a wireless local area network (WLAN) hotspot connected with the network. The WLAN hotspots can be created by products based on IEEE 802.11x standards for the Wi-Fi® technology by Wi-Fi® Alliance. Another of the wireless communication systems may be a wireless carrier system that can be implemented using various data processing equipment, communication towers, etc. Alternatively, or in addition, the wireless carrier system may rely on satellite technology to exchange information with the user device 905.

The communication infrastructure may also include a communication-enabling system that serves as an intermediary in passing information between the item providing system and the wireless communication system. The communication-enabling system may communicate with the wireless communication system (e.g., a wireless carrier) via a dedicated channel, and may communicate with the item providing system via a non-dedicated communication mechanism, e.g., a public Wide Area Network (WAN) such as the Internet.

The user devices 905 are variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The user devices 905 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. An electronic device comprising:
radio frequency (RF) circuitry comprising a RF feed and a wide area network (WAN) modem to transmit one or more signals via the RF feed;
a metal cover;
an antenna structure comprising a first strip element, a second strip element, and a third strip element, wherein the first strip element, the second strip element, and the third strip element are disposed at a periphery of the metal cover between a first corner and a second corner of an edge of the metal cover, wherein the first strip element, the second strip element, and the third strip element are physically separated from one another by cutouts in the metal cover;
a system on a chip (SoC) coupled to the first strip element, the second strip element, and the third strip element, the SoC comprising proximity sensing circuitry, wherein:
the proximity sensing circuitry is to:
measure a first capacitance value of the first strip element, wherein the first capacitance value is associated with a first distance between an object and the first strip element;
measure a second capacitance value of the second strip element, wherein the second capacitance value is associated with a second distance between the object and the second strip element;
measure a third capacitance value of the third strip element, wherein the third capacitance value is associated with a third distance between the object and the third strip element;
determine that the first capacitance value exceeds a first threshold value, wherein the first threshold value is a first specified capacitance value associated with a first specified distance away from the first strip element; and
the SoC is to reduce a transmission power for the one or more signals from a first transmission power level to a second transmission power level to reduce a specific absorption rate (SAR);
switching circuitry coupled to the first strip element and the second strip element;
the WAN modem is coupled to the switching circuitry and coupled to the SoC, the WAN modem is to:
receive, from the SoC, the first capacitance value, the second capacitance value, and the third capacitance value;
determine that the first capacitance value does not exceed a second threshold value, that the second capacitance value does not exceed a third threshold value and is not greater than the first capacitance value, and the third capacitance value does not exceed a fourth threshold value; and
select the second strip element, via the switching circuitry, to transmit the one or more signals.

2. The electronic device of claim 1, wherein
the modem is further to:
determine that the object is adjacent to the first strip element, the second strip element, and the third strip element; and
reduce the transmission power to transmit the one or more signals, in response to the object being adjacent to the first strip element, the second strip element, and the third strip element.

3. The electronic device of claim 2, wherein:
the electronic device further comprises a memory device coupled to the WAN modem, the memory device is further to:

store the second threshold value, wherein the second threshold value is associated with a first RF mode; and store the third threshold value, wherein the third threshold value is a third specified capacitance value associated with a third specified distance away from the first strip element for a second RF mode; and the WAN modem is further to:
    transmit the one or more signals via the second strip element in the second RF mode;
    retrieve the third threshold value;
    determine that the second capacitance value exceeds the first capacitance value and the second capacitance value exceeds the third threshold value; and
    select the first strip element, via the switching circuitry, to transmit the one or more signals.

4. An apparatus comprising:
a modem to transmit one or more signals via a radio frequency (RF) feed;
a metal cover;
an antenna structure coupled to the RF feed, the antenna structure comprising a first element, a second element, and a third element, wherein the first element, the second element, and the third element are disposed at a periphery of the metal cover between a first corner and a second corner of an edge of the metal cover, wherein the first element and the second element are physically separated by a cutout in the metal cover;
an application processor comprising proximity sensing circuitry, the application processor being coupled to the first element, the second element, and the third element, wherein the application processor is to:
    measure a first capacitance value of the first element;
    measure a second capacitance value of the second element; and
    measure a third capacitance value of the third element;
switching circuitry coupled to the first element, the second element, and the third element;
the modem coupled to the switching circuitry and the application processor, wherein the modem is to:
    receive, from the application processor, the first capacitance value, the second capacitance value, and the third capacitance value;
    determine that the first capacitance value does not exceed a first threshold value, that the second capacitance value does not exceed a second threshold value and is not greater than the first capacitance value, and the third capacitance value does not exceed a third threshold value; and
    select the second element, via the switching circuitry, to transmit the one or more signals.

5. The apparatus of claim 4, wherein the modem is further to:
    determine that the third capacitance value exceeds a third threshold value;
    determine that an object is adjacent to the first element, the second element, and the third element; and
    reduce a transmission power to transmit the one or more signals in response to the third capacitance value exceeding the third threshold value.

6. The apparatus of claim 5, wherein the object is a human body part and the modem is to reduce the transmission power from a first transmission power level to a second transmission power level.

7. The apparatus of claim 4, further comprising a memory device coupled to the modem, wherein:

the memory device is further to:
    store the first threshold value associated with a first RF mode; and
    store the second threshold value associated with a second RF mode;
the modem is further to:
    transmit the one or more signals via the second element;
    retrieve the second threshold value from the memory device;
    determine that the second capacitance value exceeds the first capacitance value and the second capacitance value exceeds the second threshold value; and
    select the first element, via the switching circuitry, to transmit the one or more signals.

8. The apparatus of claim 7, wherein the first RF mode or the second RF mode is a 4G long term evolution (LTE) mode for transmitting signals using a 4G LTE communication standard, a 3G mode for transmitting signals using a 3G communication standard, a 2G mode for transmitting signals using a 2G communication standard, a 2×2 WLAN multiple input multiple output (MIMO) mode for transmitting signals using a 2×2 WLAN MIMO communication standard, or a 1×1 WLAN single input single output (SISO) mode for transmitting signals using a 1×1 WLAN SISO communication standard.

9. The apparatus of claim 7, wherein the application processor is to:
    disengage the second element after measuring the second capacitance value; and
    store the second capacitance value in the memory device of the apparatus.

10. The apparatus of claim 4, wherein the first element is a primary antenna and the second element is a diversity antenna for a 4G LTE mode or a 3G mode.

11. The apparatus of claim 4, wherein the proximity sensing circuitry further comprises a proximity sensor coupled to the application processor, wherein:
the application processor is further to:
    measure a proximity of an object to the first element using the proximity sensor to obtain a first proximity measurement value;
    measure a proximity of the object to the second element using the proximity sensor to obtain a second proximity measurement value; and
    send the first proximity measurement value and second proximity measurement value to the modem; and
the modem is further to:
    determine that the first proximity measurement value being greater than the second proximity measurement value;
    determine that the object is closer to the first element than the second element; and
    send a switch setting to the switching circuitry instructing the switching circuitry to select the second element to transmit the one or more signals.

12. The apparatus of claim 4, wherein the application processor is further to:
    determine a state of the application processor, wherein the state of the application processor is an idle state, an acquisition state, an access state, or a traffic state; and
    select the second element when the application processor is in the idle state.

13. An apparatus comprising:
switching circuitry;
radio frequency (RF) circuitry comprising a RF feed and a modem to transmit one or more signals via the RF feed;

a metal cover;

an antenna structure comprising a first element a second element, and a third element, wherein the first element and the second element are disposed at a periphery of the metal cover between a first corner and a second corner of an edge of the metal cover, wherein the first element and the second element are physically separated by a cutout in the metal cover;

an application processor coupled to the first element and the second element, the application processor comprising proximity sensing circuitry, wherein:

the proximity sensing circuitry is to measure a first capacitance value of the first element, a second capacitance value of the second element, and a third capacitance of the third element;

the modem is coupled to the switching circuitry and coupled to the application processor, wherein the modem is to:

determine whether an object is proximate to the first element, the second element, the third element, or the first element, the second element and the third element;

select the first element, via the switching circuitry, to transmit the one or more signals when the object is determined to be proximate to the second element and not the first element; and select the second element, via the switching circuitry, to transmit the one or more signals when the first capacitance value does not exceed a first threshold value, that the second capacitance value does not exceed a second threshold value and is not greater than the first capacitance value, and the third capacitance value does not exceed a third threshold value.

14. The apparatus of claim 13, wherein:

the antenna structure further comprises a loop antenna; and the modem is to transmit the one or more signals via the loop antenna.

15. The apparatus of claim 13, wherein to determine that the object is proximate to the first element, the modem is further to determine that the second capacitance value is less than the first capacitance value.

16. The apparatus of claim 13, wherein to determine that the object is proximate the first element, the modem is further is further to determine that the first capacitance value exceeds the first threshold value, that the second capacitance value exceeds the second threshold value, or that the third capacitance value exceeds the third threshold value.

17. The apparatus of claim 16, wherein the modem is further to:

determine that the object is in adjacent to the first element, the second element, and the third element when the third capacitance value exceeds the third threshold value; and reduce a transmission power of the one or more signals in response to the third capacitance value exceeding the third threshold value.

18. The apparatus of claim 13, wherein the object is a metal object, a wood object, or a human body part.

19. The apparatus of claim 13, further comprising RF circuitry, the RF circuitry comprising the RF feed, the modem, and the application processor integrated together on a common carrier substrate.

20. An apparatus comprising:

switching circuitry;

radio frequency (RF) circuitry comprising a RF feed and a modem to transmit one or more signals via the RF feed;

a metal cover;

an antenna structure comprising a first element a second element, and a third element, wherein the first element and the second element are disposed at a periphery of the metal cover between a first corner and a second corner of an edge of the metal cover, wherein the first element and the second element are physically separated by a cutout in the metal cover;

an application processor coupled to the first element and the second element, the application processor comprising proximity sensing circuitry, wherein:

the proximity sensing circuitry is to measure a first capacitance value of the first element, a second capacitance value of the second element, and a third capacitance of the third element;

the modem is coupled to the switching circuitry and coupled to the application processor, wherein the modem is to:

determine whether an object is proximate to the first element, the second element, the third element, or the first element, the second element and the third element;

select the first element, via the switching circuitry, to transmit the one or more signals when the object is determined to be proximate to the second element and not the first element; and select the second element, via the switching circuitry, to transmit the one or more signals when the object is determined to be proximate to the first element and not the second element, wherein to determine whether the object is proximate the first element, the modem is further to:

determine that the first capacitance value does not exceed a first threshold value, that the second capacitance value does not exceed a second threshold value, and that the third capacitance value does not exceed a third threshold value; and determine that the second capacitance value is not greater than the first capacitance value.

* * * * *